United States Patent
Lastinger et al.

(10) Patent No.: US 7,424,298 B2
(45) Date of Patent: Sep. 9, 2008

(54) METHODS AND APPARATUS FOR CHANNEL ASSIGNMENT

(75) Inventors: Roc Lastinger, Cave Creek, AZ (US); John Spenik, Phoenix, AZ (US); Brian Woodbury, Gilbert, AZ (US)

(73) Assignee: Rotani, Inc., Scottsdale, AZ (US)

( * ) Notice: Subject to any disclaimer, the term of this patent is extended or adjusted under 35 U.S.C. 154(b) by 0 days.

(21) Appl. No.: 12/020,932

(22) Filed: Jan. 28, 2008

(65) Prior Publication Data

US 2008/0132261 A1 Jun. 5, 2008

Related U.S. Application Data

(62) Division of application No. 10/880,387, filed on Jun. 29, 2004, now Pat. No. 7,359,675.

(60) Provisional application No. 60/493,663, filed on Aug. 8, 2003, provisional application No. 60/484,800, filed on Jul. 3, 2003.

(51) Int. Cl.
*H04Q 7/20* (2006.01)
*H04B 15/00* (2006.01)

(52) U.S. Cl. ..................... 455/447; 455/63.2

(58) Field of Classification Search .............. 455/63.2, 455/422.1, 446–447, 449–450
See application file for complete search history.

(56) References Cited

U.S. PATENT DOCUMENTS

| 4,144,496 | A | 3/1979 | Cunningham et al. |
|---|---|---|---|
| 5,161,249 | A | 11/1992 | Meche et al. |
| 5,771,449 | A | 6/1998 | Blasing |
| 6,104,935 | A | 8/2000 | Smith et al. |
| 6,128,497 | A * | 10/2000 | Faruque ............ 455/447 |
| 6,229,486 | B1 | 5/2001 | Krile |
| 6,246,674 | B1 | 6/2001 | Feuerstein et al. |
| 6,272,337 | B1 | 8/2001 | Mount et al. |
| 6,278,723 | B1 | 8/2001 | Meihofer |
| 6,304,762 | B1 | 10/2001 | Myers et al. |
| 6,400,955 | B1 | 6/2002 | Kawabata |
| 6,405,058 | B2 | 6/2002 | Bobier |
| 6,421,542 | B1 | 7/2002 | Sandler et al. |
| 6,463,301 | B1 | 10/2002 | Bevan |
| 6,470,195 | B1 | 10/2002 | Meyer |
| 6,486,832 | B1 | 11/2002 | Abramov |
| 6,505,045 | B1 | 1/2003 | Hills |
| 6,531,985 | B1 | 3/2003 | Jones |
| 6,542,736 | B1 | 4/2003 | Parkvall et al. |
| 6,560,443 | B1 | 5/2003 | Vaisanen |
| 6,690,657 | B1 | 2/2004 | Lau |
| 6,693,510 | B1 | 2/2004 | Yamaguchi |
| 7,359,675 | B2 * | 4/2008 | Lastinger et al. ........... 455/63.1 |
| 2001/0046866 | A1 | 11/2001 | Wang |
| 2002/0019233 | A1 * | 2/2002 | Leung et al. ............... 455/447 |
| 2002/0077152 | A1 | 6/2002 | Johnson et al. |
| 2002/0159405 | A1 | 10/2002 | Garrison et al. |

(Continued)

*Primary Examiner*—Lee Nguyen
(74) *Attorney, Agent, or Firm*—Letham Law Firm LLC; Lawrence Letham

(57) ABSTRACT

Methods and apparatus for high throughput wireless cells and networks are described. The wireless cells may be equipped with multiple radios. Antennas may be arranged into overlapping and non-overlapping patterns. Channels may be assigned to foster servicing clients, and inter-cell communication. Attenuation may be used to decrease interference. Networks may be formed using a variety of methods and apparatus.

6 Claims, 27 Drawing Sheets

U.S. PATENT DOCUMENTS

| | | |
|---|---|---|
| 2002/0197984 A1 | 12/2002 | Monin et al. |
| 2003/0002442 A1 | 1/2003 | Flammer |
| 2003/0087645 A1 | 5/2003 | Kim |
| 2003/0109285 A1 | 6/2003 | Reed |
| 2003/0125089 A1 | 7/2003 | Pedersen |
| 2003/0181180 A1 | 9/2003 | Darabi |
| 2003/0210665 A1 | 11/2003 | Salmenkaita et al. |
| 2004/0009791 A1 | 1/2004 | Hiramatsu |
| 2004/0106412 A1 | 6/2004 | Laroia et al. |
| 2004/0196834 A1 | 10/2004 | Ofek |

* cited by examiner

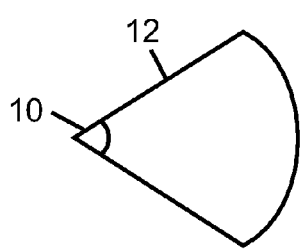
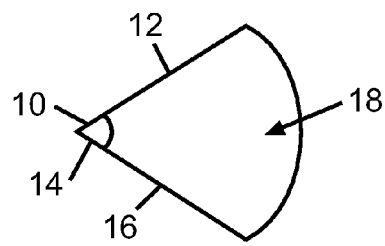
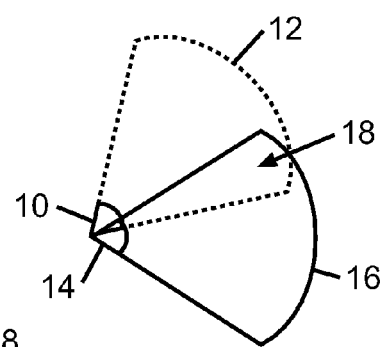
FIG. 1
FIG. 3
FIG. 2
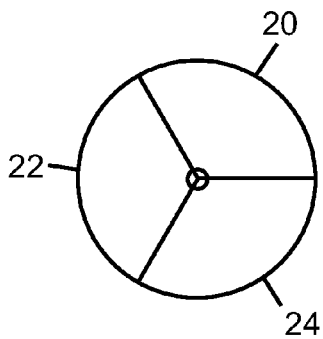
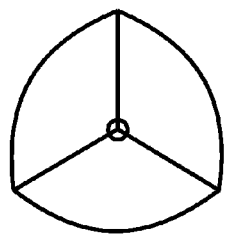
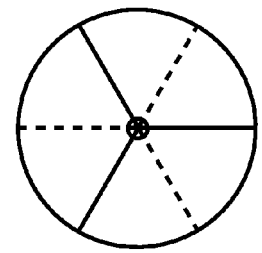
FIG. 4
FIG. 6
FIG. 8
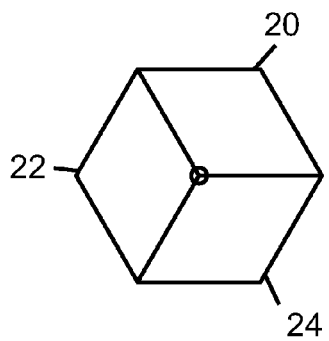
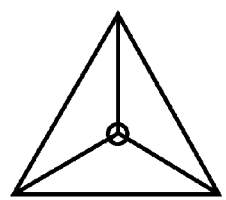
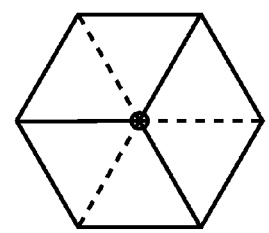
FIG. 5
FIG. 7
FIG. 9

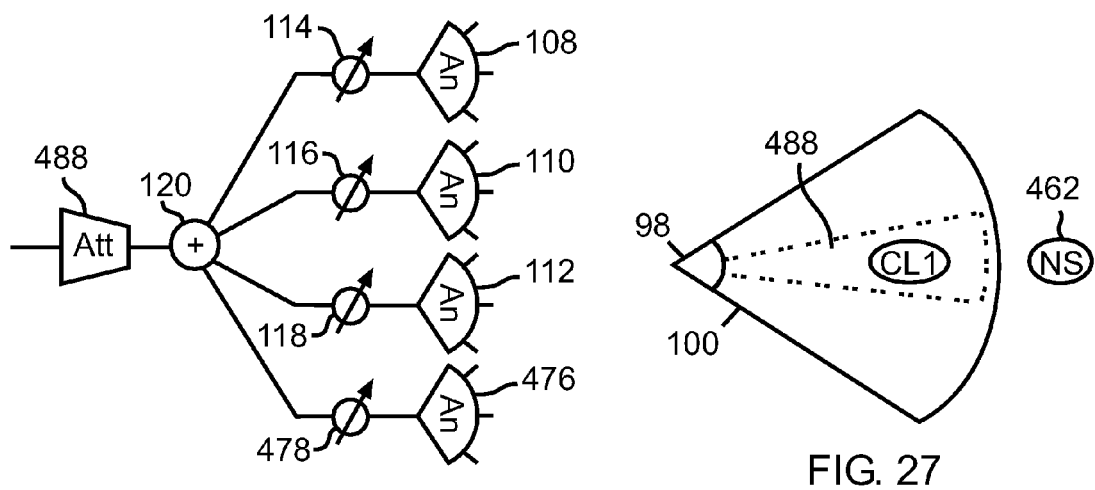
FIG. 26
FIG. 27
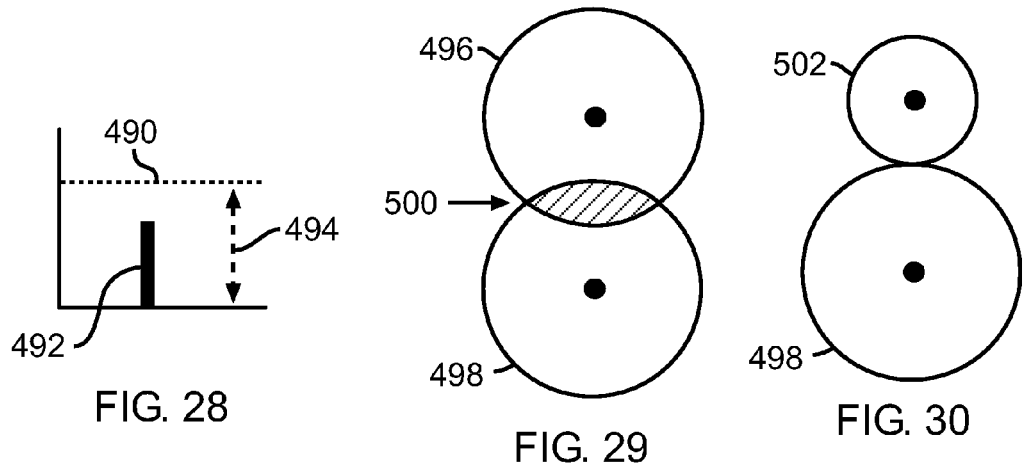
FIG. 28
FIG. 29
FIG. 30
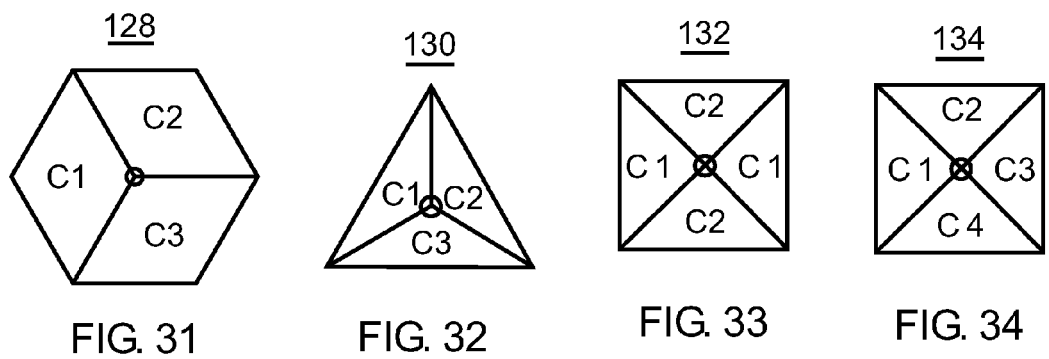
FIG. 31
FIG. 32
FIG. 33
FIG. 34

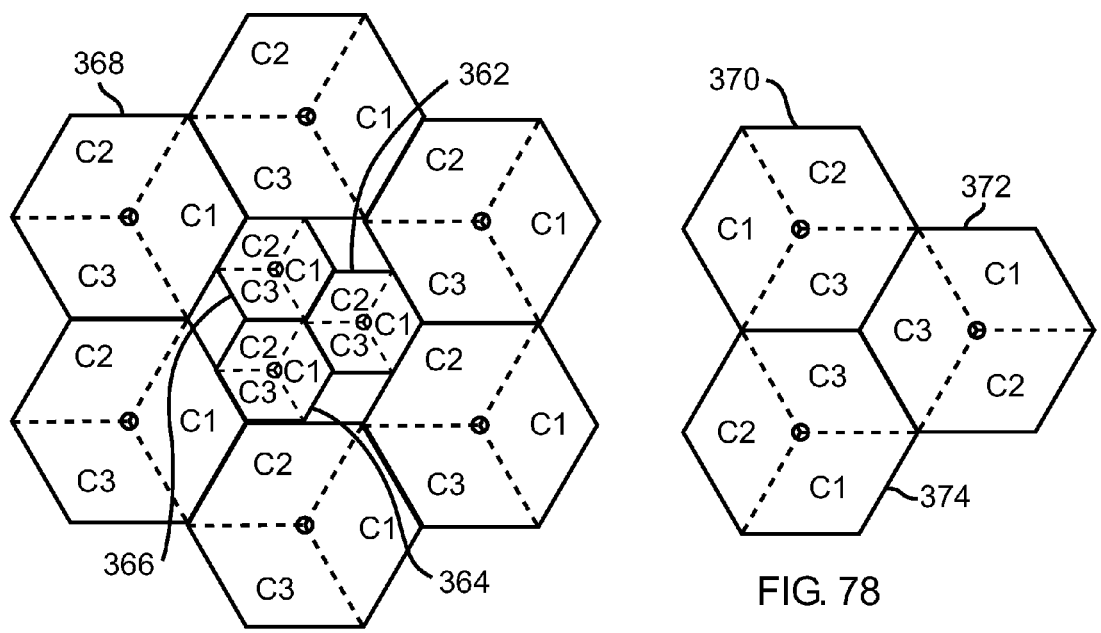
FIG. 77
FIG. 78
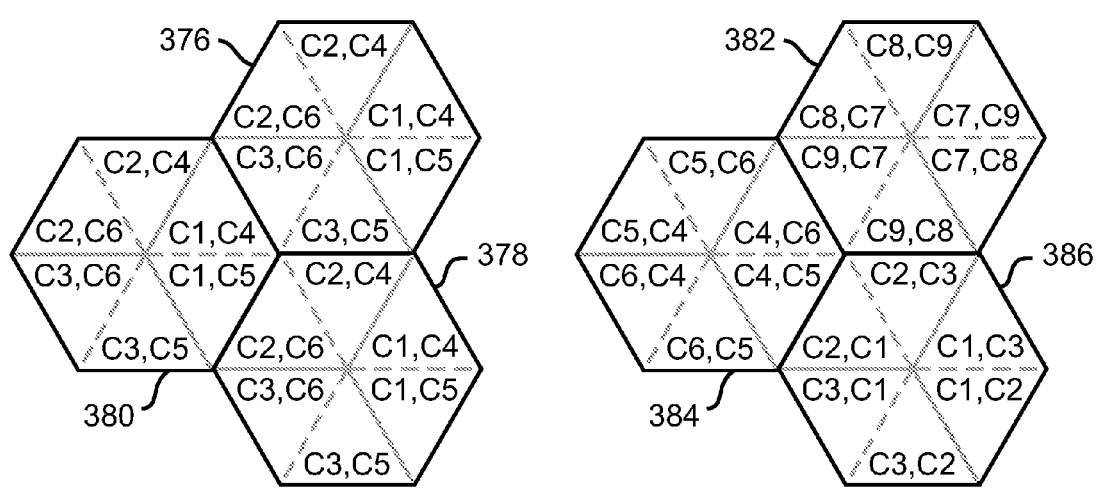
FIG. 79
FIG. 80

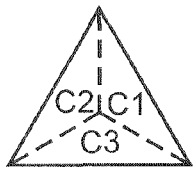 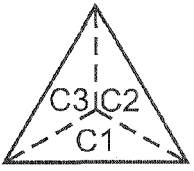 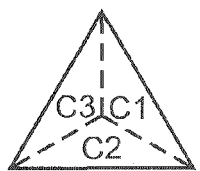 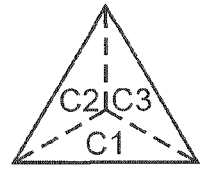 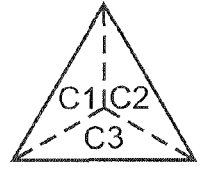
FIG. 92  FIG. 93  FIG. 94  FIG. 95  FIG. 96
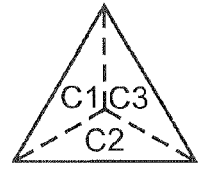
FIG. 97
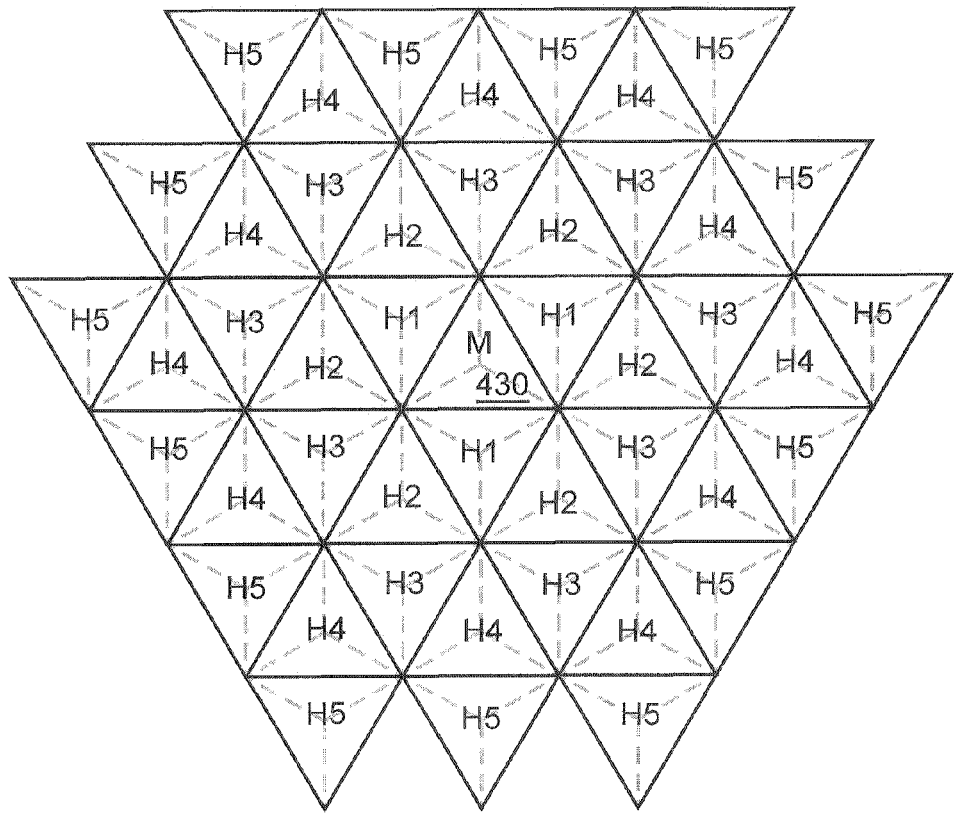
FIG. 98

METHODS AND APPARATUS FOR CHANNEL ASSIGNMENT

CROSS-REFERENCE TO RELATED APPLICATIONS

Pursuant to 35 U.S.C. §§120-121 this application is a divisional of and claims the benefit of U.S. application Ser. No. 10/880,387 filed Jun. 29, 2004 now U.S. Pat. No. 7,359,675, which claims the benefit under 35 U.S.C. §§119(e) U.S. provisional application No. 60/493,663 filed Aug. 8, 2003 herein incorporated by reference and U.S. provisional application No. 60/484,800 filed Jul. 3, 2003 herein incorporated by reference.

BACKGROUND OF THE INVENTION

1. Field of the Invention

This invention generally relates to wireless communications, and more particularly, to systems and methods for wireless cells, wireless networks, access points, and clients.

2. Description of Related Art

Many systems incorporate the IEEE 802.11 protocols, channels, and encoding to create wireless access points and clients capable of communicating with each other regardless of the manufacturer of the device. As such, the popularity of wireless access and connectivity has increased demand for wireless throughput. However, most of the current generation of wireless access points and devices are limited in that they use omni-directional antennas assigned to a single channel. The demand for wireless access has increased the demand for higher wireless data throughput per wireless device, the reduction of interference between wireless devices, and wireless devices adapted to form wireless networks.

BRIEF SUMMARY OF THE INVENTION

The invention overcomes the limitations and problems of the prior art by providing an improved wireless cell that wirelessly communicates with other apparatus including, for example, other wireless cells. In one embodiment, the wireless cell includes at least one of sectorized coverage, attenuation, overlapping or non-overlapping antenna physical sector arrangements, and minimally interfering radio channels to enable multiple antennas and multiple radios to substantially simultaneously operate and to provide, for example, increased data throughput, and improved channel reuse while minimizing the interference with foreign wireless devices.

In another embodiment, sectorized wireless cells are positioned to form networks of wireless cells that may perform at least one of servicing clients, routing between related wireless cells, and routing data between wireless cells and wired networks.

BRIEF DESCRIPTION OF THE SEVERAL VIEWS OF THE DRAWING(S)

A more complete understanding of the present invention may be derived by referring to the detailed description and claims when considered in connection with the Figures, wherein like reference numbers refer to similar elements throughout the Figures, and:

FIG. 1 is a diagram of an exemplary area of coverage, or physical sector, of a directional antenna;

FIG. 2 is a diagram of two exemplary overlapping physical sectors forming an exemplary virtual sector;

FIG. 3 is a diagram of an exemplary virtual sector formed by the substantial overlap of about 100% of two physical sectors of substantially similar areas of coverage;

FIG. 4 is a diagram of exemplary wireless cell coverage formed by three substantially non-overlapping physical sectors each of about 120-degree angle of coverage;

FIG. 5 is a diagram of an exemplary shape of coverage similar to a hexagon that may approximate the wireless cell coverage of FIG. 4;

FIG. 6 is a diagram of exemplary wireless cell coverage formed by three substantially non-overlapping physical sectors each of about 120-degree angle of coverage;

FIG. 7 is a diagram of an exemplary shape of coverage similar to a triangle that may approximate the wireless cell coverage of FIG. 6;

FIG. 8 is a diagram of exemplary wireless cell coverage formed by six overlapping physical sectors each of about 120-degree angle of coverage with overlap of about 50%;

FIG. 9 is a diagram of an exemplary shape of coverage similar to a hexagon that may approximate the wireless cell coverage of FIG. 8;

FIG. 26 is a diagram of an exemplary adaptive antenna array with attenuation comprising of four antennas, four gain (weighing) devices, and a summation device with attenuation placed after the summation device;

FIG. 27 is a diagram of an exemplary adaptive array beam within a physical sector;

FIG. 28 is a diagram of an exemplary spread spectrum signal and noise floor wherein the spread spectrum signal strength is less the strength of the noise floor;

FIG. 29 is a diagram of two exemplary spread spectrum systems that may interfere with each other;

FIG. 30 is a diagram of two exemplary spread spectrum systems where the area of coverage of one spread spectrum system has been reduced using attenuation to minimize interference between the two systems;

FIG. 31 is a diagram of an exemplary channel assignment pattern using three channels for a wireless cell with a shape of coverage similar to a hexagon;

FIG. 32 is a diagram of an exemplary channel assignment pattern using three channels for a wireless cell with a shape of coverage similar to a triangle;

FIG. 33 is a diagram of an exemplary channel assignment pattern using two channels for a wireless cell with a shape of coverage similar to a square;

FIG. 34 is a diagram of an exemplary channel assignment pattern using four channels for a wireless cell with a shape of coverage similar to a square;

FIG. 77 is a diagram of an exemplary wireless network formed by replicating wireless cells of various sizes each with shape of coverage similar to a hexagon resulting in a network channel assignment pattern where opposing physical sectors have different channels;

FIG. 78 is a diagram of an exemplary wireless cell cluster formed using three channels and three wireless cells each with shape of coverage similar to a hexagon resulting in a cluster channel assignment pattern where opposing physical sectors have similar channels;

FIG. 79 is a diagram of an exemplary wireless cell cluster formed using six channels and three wireless cells each with shape of coverage similar to a hexagon resulting in a cluster channel assignment pattern where opposing virtual sectors have different channels;

FIG. 80 is a diagram of an exemplary wireless cell cluster formed using nine channels and three wireless cells each with shape of coverage similar to a hexagon resulting in a cluster channel assignment pattern where opposing virtual sectors have different channels;

FIG. 92 is a diagram of an exemplary channel assignment pattern for a wireless cell with shape of coverage similar to a triangle;

FIG. 93 is a diagram of an exemplary channel assignment pattern for a wireless cell with shape of coverage similar to a triangle;

FIG. 94 is a diagram of an exemplary channel assignment pattern for a wireless cell with shape of coverage similar to a triangle;

FIG. 95 is a diagram of an exemplary channel assignment pattern for a wireless cell with shape of coverage similar to a triangle;

FIG. 96 is a diagram of an exemplary channel assignment pattern for a wireless cell with shape of coverage similar to a triangle;

FIG. 97 is a diagram of an exemplary channel assignment pattern for a wireless cell with shape of coverage similar to a triangle;

FIG. 98 is a diagram of an exemplary wireless network formed using wireless cells with shape of coverage similar to a triangle and indicating hop level numbers;

DETAILED DESCRIPTION OF EXEMPLARY EMBODIMENTS

Figure 12:
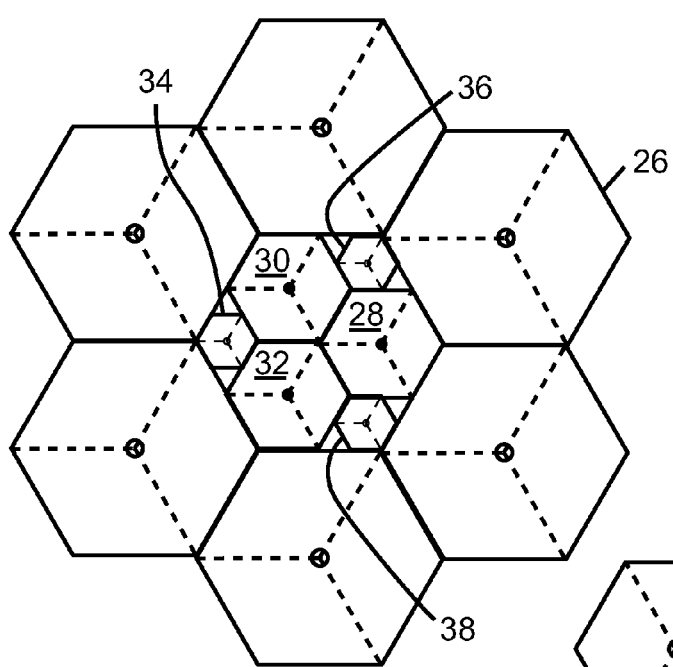
FIG. 12 is a diagram of an exemplary network embodiment where wireless cells differ in size by a factor of about one-half raised to an integer power.

The detailed description of exemplary embodiments of the invention herein refers to the accompanying drawings, which show the exemplary embodiments by way of illustration and its best mode. While these exemplary embodiments are described in sufficient detail to enable those skilled in the art to practice the invention, it should be understood that other embodiments may be realized and that logical and mechanical changes may be made without departing from the sprit and scope of the invention. Thus, the detailed description herein is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

As will be appreciated by one of ordinary skill in the art, the present invention may be embodied as a customization of an existing system, an add-on product, upgraded software, a stand-alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, semiconductor storage devices, and/or the like.

A single antenna may service a physical sector; however, multiple antennas may also service a physical sector. Antenna 10 in FIG. 1 may service physical sector 12. Antenna 10 may be a single antenna; however, antenna 10 may also include at least one of a Multiple In Multiple Out (MIMO) antenna system, a fixed array of antennas, and an adaptive array of antennas. Multiple antennas may substantially work in a coordinated manner and may be considered similar to a single antenna in that, for example, a specific physical area is covered. The physical area covered by an antenna or multiple antennas working in a coordinated manner may be referred to as a physical sector. In one embodiment, antenna 10 may be an array of antennas wherein each antenna of the array may use the same channel and substantially services area of coverage described by physical sector 12. In another embodiment, antenna 10 may be an adaptive array wherein the beams formed by the antennas may be substantially limited to area of coverage described by physical sector 12. In another embodiment, antenna 10 may be a single, directional antenna whose area of coverage may be substantially described by physical sector 12. In another embodiment, antenna 10 may be an array of antennas wherein a portion of the antennas service physical sector 12, and another portion of the antennas service a different physical sector. Therefore, the word antenna, as used in this application, may comprise a single antenna or multiple antennas working in a coordinated manner to provide coverage to physical sectors.

Independent antennas may also service substantially the same physical area. For example, in one embodiment, antennas 10 and 14 of FIG. 2 are independent antennas or multiple antennas as described above. Each antenna 10 and 14 may service physical sectors 12 and 16 respectively. The area where physical sector 12 overlaps with physical sector 16 may be referred to as a virtual sector. Virtual sector 18 may be an area where independent antennas may service the same physical area. In another embodiment, antennas 10 and 14 may be rotated until physical sectors 12 and 16 substantially overlap thereby making virtual sector 18 substantially equal to physical sectors 12 and/or 16 as shown in FIG. 3. Substantially complete, about 100%, overlap does not change the substantially independent operation of antennas 10 and 14. Antenna 10 may still independently service physical sector 12 and antenna 14 may still independently service physical sector 16 even though the physical sectors are substantially the same physical area. In another embodiment, antenna 10 and 14 may use different, minimally interfering channels that may substantially enable antenna 10 and 14 to independently and simultaneously service clients in virtual sector 18.

Figure 10:
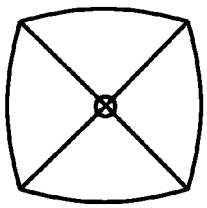
FIG. 10 is a diagram of exemplary wireless cell coverage formed by four substantially non-overlapping physical sectors each of about 90-degree angle of coverage.
Figure 11:
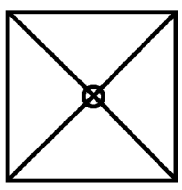
FIG. 11 is a diagram of an exemplary shape of coverage similar to a square that may approximate the wireless cell coverage of FIG. 10.

Wireless cells may be formed by arranging antennas in substantially overlapping and/or substantially non-overlapping patterns. The shape of the area of wireless cell coverage may depend on antenna characteristics and/or how the antennas are arranged. In one embodiment, three, 120-degree directional antennas with physical sectors 20, 22, and 24 may form an shape of coverage as shown in FIG. 4; however, the shape of coverage may also be approximated as a hexagon with three sectors as shown in FIG. 5. In another embodiment, the shape of coverage provided by three 120-degree directional antennas as shown in FIG. 6 may be approximated as a triangle as shown in FIG. 7. In another embodiment, the shape of coverage provided by six physical sectors with about 120-degree angular coverage each, which overlap about 50% to form six virtual sectors as shown in FIG. 8 may be approximated as a hexagon with six physical and six virtual sectors as shown in FIG. 9. In another embodiment, the wireless cell shape of coverage provided by four directional antennas each with an angle of coverage of about 90-degree, as shown in FIG. 10, may be approximated as a square as shown in FIG. 11. The shape of coverage may influence channel assignment (discussed below) and/or wireless cell placement to form networks (also discussed below).

Figure 13:
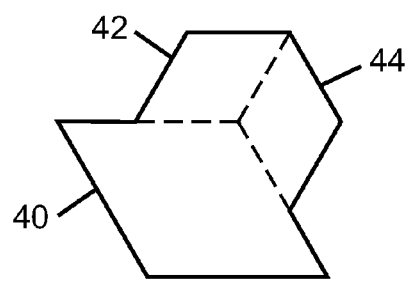
FIG. 13 is a diagram of an exemplary wireless cell where one physical sector has a different area of coverage.

The area of coverage of a wireless cell, also referred to as the size of a wireless cell, may be influenced by at least one of the attenuation of incoming and outgoing signals, radio transmit power, amplification of incoming signals, amplification of outgoing signals, and attenuation of only incoming signals. A wireless cell may have any size equal to or smaller than its maximum transmit and receive areas. In an exemplary network embodiment, wireless cells may be substantially equal in size. In another network embodiment, wireless cells may differ in size by a factor of about one-half raised to an integer power (i.e., $(cellsize)(½)^n$) where the integer may range from negative infinity to positive infinity. A factor of one-half raised to an integer power provides and infinite set of size factors of which the sequence ( . . . 1/32, 1/16, 1/8, 1/4, 1/2, 1, 2, 4, 8, 16, 32 . . . ) is exemplary. An exemplary network embodiment may contain, for example, several maximum sized cells and several cells that vary from the maximum cell size by factors of, for example, 1/32, 1/16, 1/8, 1/4, and 1/2. Forming a network with cells that may differ by a factor of about one-half raised to an integer power may enable any wireless cell to be replaced by an integer number of smaller cells while substantially providing the equivalent area of coverage. Using cells that differ in size by a factor of about one-half raised to an integer power may facilitate network formation and/or wireless cell density management. For example, six wireless cells, 28, 30, and 32 are about a factor of about one-half (1/2) less in size than wireless cell 26 and wireless cells 34, 36, and 38 are about a factor of about one-half (1/2) less in size than wireless cell 30. The six cells 28 through 38 substantially fill a coverage area similar in size to the coverage area of wireless cell 26. The utility of an embodiment that uses wireless cells that vary in size by a factor of about one-half raised to an integer power becomes apparent when channels are assigned to the wireless cell sectors; however, there are no limitations on the size of a wireless cell and/or the relative size of wireless cells in a network. Additionally, the sizes of individual sectors of a wireless cell are also not limited. For example, in one embodiment, one sector, referring to sector 40 of FIG. 13, is larger than the other two sectors 42 and 44. In another embodiment, each sector may have substantially different sizes.

Figure 14:
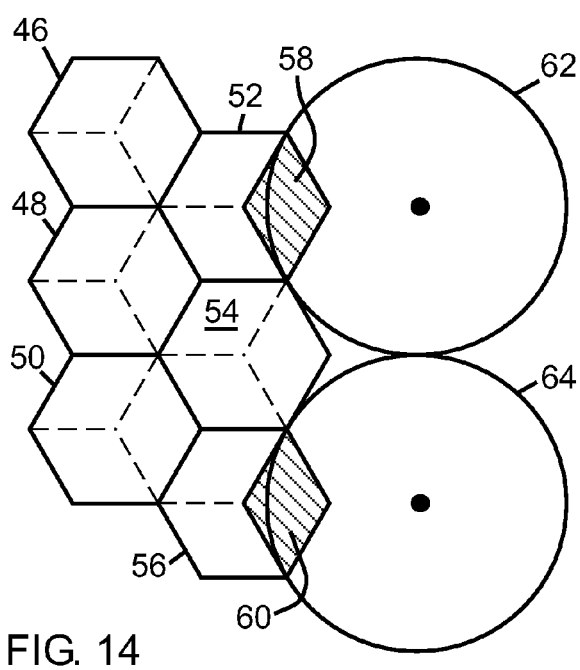
FIG. 14 is a diagram of an exemplary network that may conflict with foreign wireless cells.

Related wireless cells may be considered as part of the same network and may communicate with each other by any means such as, for example, a wired interface, an optical interface, and a wireless interface. Related wireless cells may be designed to, for example, work together, and minimize interference between each other. A foreign wireless cell may be, for example, part of an unrelated network, unable to communicate, independently controlled, under different ownership, and under separate management. For example, wireless cells 46 through 56 in FIG. 14 may be considered related because they may do at least one of communicate between adjacent wireless cells, route data between wireless cells, and cooperate to minimize interference between wireless cells. In this example, still referring to FIG. 14, omni-directional wireless cells 62 and 64 are not related (i.e., are foreign) to wireless cells 46 through 56. No direct connection and/or cooperation may exist between the hexagonal wireless cells and the omni-directional cells. In this example, omni-directional cells 62 and 64 may interfere with physical sectors 58 and 60 of wireless cells 52 and 56 respectively.

Figure 15:
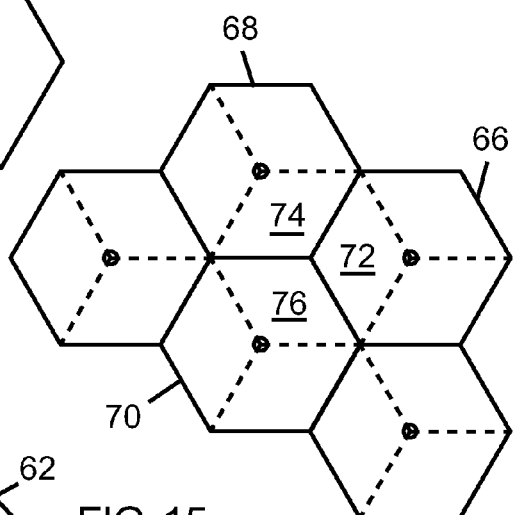
FIG. 15 is a diagram of exemplary adjacent wireless cells, adjacent physical sectors, and opposing physical sectors.

Wireless cells 66, 68, and 70 of FIG. 15 may be referred to as contiguous or adjacent because the drawn cell boundary of each wireless cell substantially touches the drawn boundary of the other wireless cells. The sectors 72, 74, and 76 of wireless cells 66, 68, and 70 respectively may be referred to as opposing. Sector 72 may be substantially opposite sectors 74 and 76, sector 74 may be substantially opposite 72 and 76, and 76 may be substantially opposite 72 and 74. Adjacent wireless cells may wirelessly communicate with each other through opposing sectors if the radios of the opposing sector antennas use a similar channel.

Figure 16:
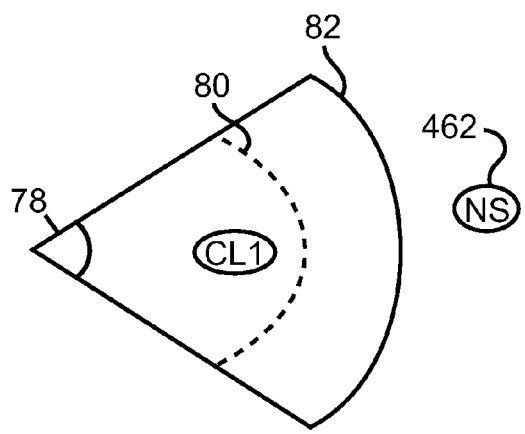
FIG. 16 is a diagram of exemplary spatial effects of attenuation with relation to a client and a noise source.

Now turning to attenuation. Attenuation of incoming signals may reduce interference and/or improve signal-to-noise ratio. The potential benefits of attenuation may be described spatially or alternately from the perspective of signal-to-noise ratio. From the spatial perspective, as shown in FIG. 16, attenuation may decrease an antenna's area of coverage. With little attenuation, the coverage area of antenna 78 may extend to about line 82. Noise source 462 may lie substantially outside the area of coverage, but its signal may still be received by antenna 78 and may interfere with the signal from client CL1. Attenuating signals incoming through antenna 78 may decrease the receive coverage area from about line 82 to about line 80. Decreasing the receive coverage area may make the radio perceive noise source 462 as being spatially farther away because the noise source signal strength may be weaker when the signal is attenuated. The farther a client lies outside the receive coverage area, the less its signal may be likely to interfere.

Figure 17:
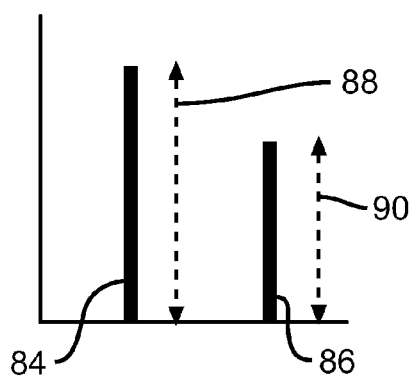
FIG. 17 is a diagram of exemplary client and noise source signal strengths without attenuation.
Figure 18:
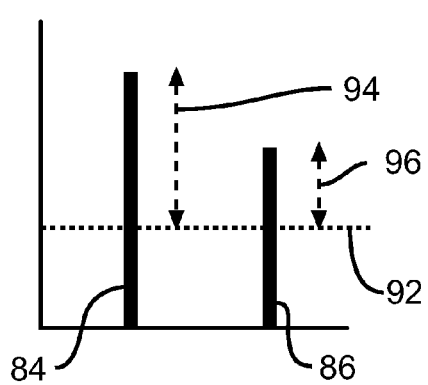
FIG. 18 is a diagram of exemplary client and noise source signal strengths with attenuation.

Alternately, the potential benefits of attenuation on the signal-to-noise ratio may be depicted in FIG. 17 and FIG. 18. Referring to FIG. 17 and FIG. 18, the y-axis shows signal strength as it may be measured at antenna 78. The x-axis shows the distance of the clients from antenna 78. Signal 84 and 86 represent signals that may be received at antenna 78 from client CL1 and noise source 462 respectively. A noise source may be, for example, another client, another wireless cell, a microwave oven, or other apparatus. Lines 88, 90, 94, and 96 may represent signal strength after attenuation as perceived by the radio attached to antenna 78. FIG. 17 depicts the situation where there may be little attenuation. Noise source 462 may transmit at the same signal strength as client CL2, but because it may be farther away, its signal strength as measured at antenna 78 may not be as strong as the signal from client CL1; therefore, line 86, may be represented as smaller than line 84. Because there is little attenuation, the radio perceives substantially the full signal strength from client CL1 and noise source 462 as depicted by lines 88 and 90 respectively. The signal-to-noise ratio is about the ratio of the desired signal strength, represented by line 88, to the noise source signal strength represented by line 90. FIG. 18 may depict the situation where some attenuation may be applied to the incoming signals. The signals from the client and the noise source, 84 and 86 respectively, are attenuated a similar amount as shown by line 92; therefore, the client and noise source signals strengths as perceived by the radio attached to antenna 78 may decrease and may be represented by lines 94 and 96 respectively. The signal-to-noise ratio with attenuation may be the ratio of the desired signal strength, represented by line 94, to the noise source signal strength represented by line 96. Because signals 84 and 86 may be attenuated by a similar amount, the ratio of the desired signal strength, 94, to the noise signal strength, 96, may show improvement in signal-to-noise ratio as the attenuation is increased.

Figure 19:
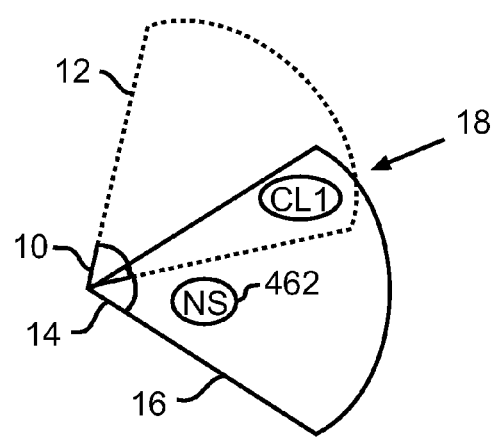
FIG. 19 is a diagram of two exemplary overlapping physical sectors, a client and a noise source.
Figure 20:
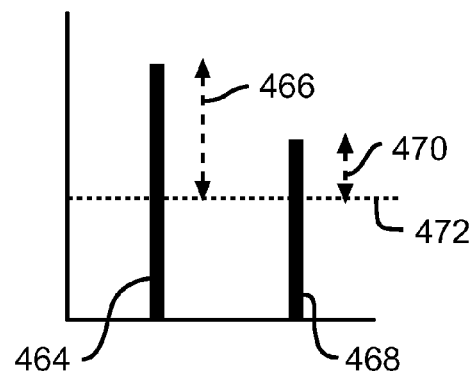
FIG. 20 is a diagram of exemplary client and noise source signal strengths in the same physical sector and the exemplary effects of attenuation.
Figure 21:
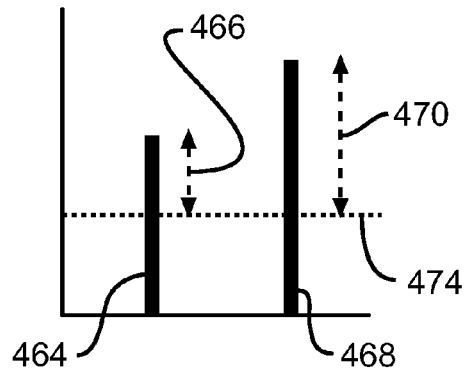
FIG. 21 is a diagram of exemplary client and noise source signal strengths where the client lies substantially within the physical sector and the noise source lies substantially outside the physical sector and the exemplary effects of attenuation.

Attenuation may provide less benefit when the signal from the noise source is relatively stronger than the signal from the desired source. Referring to FIG. 19, both noise source 462 and client CL1 may lie within physical sector 16 of antenna 14. The noise source may lie closer to antenna 14 than client CL1, the noise source may interfere with signals from client CL1, and the noise source may have a stronger signal level as measured at antenna 14 than client CL1. For this example, assume that the noise source and client CL1 transmit with the same signal strength; however, because the noise source lies closer to antenna 14 the client CL1, antenna 14 may perceive the signal from noise source 462 as being stronger than the signal from client CL1. Under such exemplary circumstances, the signal from noise source 462 and the signal from client CL1, as perceived by antenna 14, may be represented by lines 464 and 468 respectively in FIG. 20. Applying attenuation, represented by line 472, to the incoming signals of antenna 14 may decrease the signal strengths of noise source 464 and client CL1 468 as perceived by the radio attached to antenna 14 and may be represented by lines 466 and 470 respectively. The signal-to-noise ratio may be the ratio of the desired signal strength, represented by line 470, to the noise source signal strength represented by line 466. Applying attenuation in the exemplary circumstance represented in FIG. 20 may decrease the signal-to-noise ratio and may result in a situation where the radio may not detect the desired signal. However, any possible decline in the signal-to-noise ratio may be reversed by combining attenuation with overlapping or non-overlapping physical sectors. Referring again to FIG. 19, in the above example, both the noise source and client CL1 were serviced by antenna 14; however, noise source 462 may lie substantially outside of physical sector 12 while client CL1 may lie substantially within physical sector 12. The relative signal strengths of noise source 462 and client CL1 as perceived by antenna 10 may be different than the relative strengths as perceived by antenna 14. For this example, directional antenna 10 may perceive the signal strength from noise source 462 as being less than the signal strength from client CL1. Referring to FIG. 21, line 464 and 468 may represent the noise signal and the desired signal strengths respectively. Although noise source 462 may be closer to antenna 10 than client CL1, its signal may be perceived at antenna 10 as weaker than the signal from client CL1. Applying attenuation to the incoming signals of antenna 10, the radio may perceive the noise signal strength as line 466 and client CL1 signal strength as line 470. Again, the signal-to-noise ratio may be the ratio of desired signal strength 470 to the noise source signal strength 466. Under these sample circumstances, increasing attenuation may increase the signal-to-noise ratio and may provide a relatively stronger desired signal to the radio. Therefore, in a multiphysical sector wireless cell embodiment, one antenna may perceive the noise source as being stronger than the desired signal while another antenna may not. In an exemplary wireless cell embodiment, the wireless cell selects the antenna where the desired signal may be stronger than the noise signal and then may apply attenuation to further improve the signal-to-noise ratio.

There are no limitations on the apparatus or methods of attenuating signals, or where in the signal path attenuation may be performed, or whether the incoming, outgoing or both incoming and outgoing signals may be attenuated. An exemplary embodiment may position an RF attenuator next to the antenna in the signal path. Attenuation may be performed using at least one of hardware adapted to attenuate signals, digital signal processing performed by a combination of hardware and software, and by physically placing attenuating material to block an antenna. An exemplary embodiment may use a hardware, RF attenuator. Attenuation may be at least one of fixed in amount of attenuation and variable in amount of attenuation. An exemplary embodiment may use variable attenuation that may be changed under predetermined conditions. The amount of attenuation that may be required may be determined by, for example, the strength of undesirable signals, relationship of attenuation to data throughput, and reduction of wireless cell area of coverage.

Figure 22:
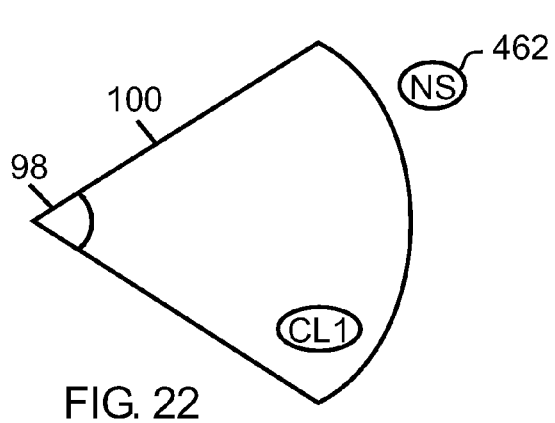
FIG. 22 is a diagram of an exemplary adaptive antenna array servicing a physical sector.
Figure 23:
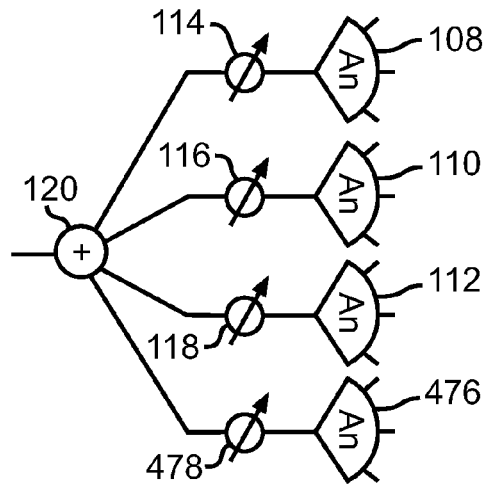
FIG. 23 is a diagram of exemplary adaptive antenna array components comprising of four antennas, four gain (weighing) circuits, and a summation device.

Now turning to attenuation in adaptive antenna arrays. Attenuation is different from and may be used in conjunction with the weighting techniques at times used in adaptive antenna arrays. As discussed above, a physical sector may be serviced by an array of antennas. For example, adaptive antenna array 98 may service physical sector 100 as shown in FIG. 22. An exemplary adaptive antenna array may have four antennas, 108, 110, 112, and 476 as shown in FIG. 23. A client CL1 may lie substantially within physical sector 100 and may transmit the desired signal. A noise source 462 may lie substantially outside physical sector 100 and may interfere with signals from CL1. Referring to FIG. 23, the adaptive antenna array may compensate for (i.e., null) the noise signal from noise source 462 by adjusting the gain (i.e., weight) 114, 116, 118, and 478 of the signals received by the antennas. The signal from the antenna of the array that receives the strongest signal from client CL1 may receive a higher weight (gain) than the signals from the other antennas of the array. Weighting the signals; however, may not change the signal-to-noise ratio because the gain (weight) circuits, 114, 116, 118, and 478, may amplify both noise and desired signal. Any improvement in the signal-to-noise ratio may occur in the summation device 120 where the weighted signals may be combined.

Figure 25:
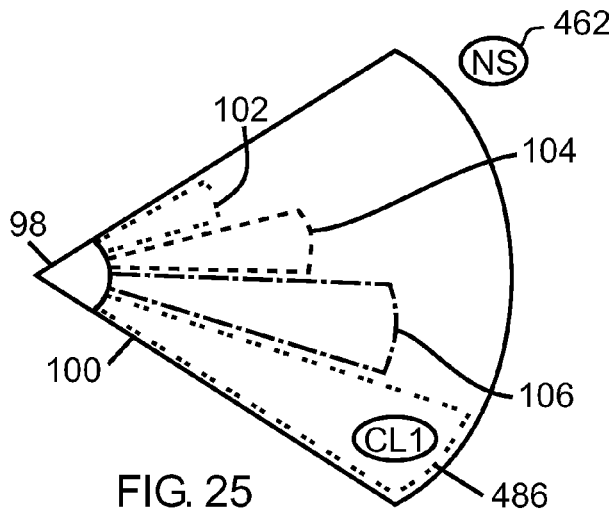
FIG. 25 is a diagram of exemplary coverage of an adaptive array with attenuation.
Figure 24:
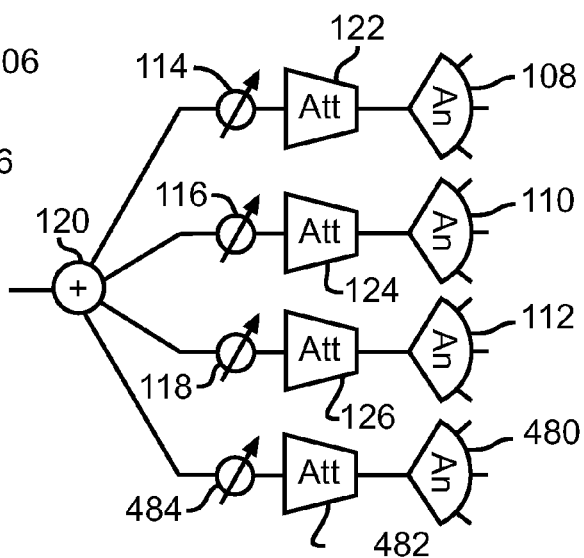
FIG. 24 is a diagram of an exemplary adaptive antenna array with attenuation comprising of four antennas, four gain (weighing) devices, and a summation device with attenuation placed between the antennas and the gain devices.

Attenuation may be added at any point in an adaptive array such as, for example, between the antennas and the gain circuits, between the weighting circuit and the summation device, and after the summation device. An exemplary embodiment, adds attenuation before at least one weighting circuit, as shown in FIG. 24. Attenuation may be done by hardware or a combination of hardware and software and may be fixed or adjustable. In an exemplary embodiment, the attenuation is adjustable. Referring to FIG. 25, the physical sector coverage areas, 102, 104, 106, and 486 show possible areas of coverage of the physical sectors of antenna 108, 110, 112, and 480 of the adaptive array. The area of coverage of each antenna physical sector may be spatially adjusted by attenuation. The attenuation may also modify the signal-to-noise ratio through each antenna. For example, antenna 108 may receive a stronger signal from the noise source than from client CL1. Because the signal strength of the noise source may be stronger than the desired signal from client CL1, increasing attenuation 122 may decrease the signal-to-noise ratio, as described above, leaving a signal that may have little desired signal content, which may allow the weighing circuit 114 to apply a lower gain value than it may have applied without attenuation. Antenna 110 may also receive a stronger signal from the noise source than from client CL1. Increasing attenuation 124 may decrease the signal-to-noise ratio leaving a signal to which weighing (gain) circuit 116 may apply a lower gain value than it may have applied to a signal with less attenuation. Antenna 112 may perceive the signal from client CL1 as being stronger than the signal from the noise source; therefore, increasing the attenuation of attenuator 126 may improve the signal-to-noise ratio; thereby enabling the weighing circuit 118 to apply a higher gain value than it may have applied without attenuation. Antenna 480 may receive a substantially stronger signal from client CL1 than from the noise source; therefore, increasing attenuation 482 may improve the signal-to-noise ratio and weighing circuit 484 may apply a larger weight than may otherwise be applied without attenuation. The attenuators may act to increase or decrease the signal-to-noise ratio; thereby providing signals to the weighing circuits that may be more easily distinguished as desirable signal or noise. The use of attenuators between the gain circuits and the antennas may enable the weighing circuits to produce results that may be more decisive.

In anther adaptive antenna array embodiment, referring to FIG. 26, attenuation may be placed after summation device 120. Placing attenuation after the summation device may help in situations where the noise source may be in line with the beam formed by the adaptive array. Referring to FIG. 27, the adaptive antenna area may operate to form a beam to receive signals from client CL1; however, noise source 462 may lie nearly in line with the antenna beam direct at client CL1 and may interfere. Attenuating the beam signal using attenuator 488 may decrease the area of coverage of the beam and may increase the ratio of client CL1 signal to noise source 462 signal; thereby increasing the signal-to-noise ratio.

Now turning to attenuation in a Multiple Input Multiple Output (MIMO) antenna. Multiple antennas may operate in a coordinated manner to provide coverage to a physical sector. Various embodiments of a MIMO antenna may include at least one of, for example, antenna arrays, adaptive antenna array, multiple antennas with at least one of spatial, angular, and polarization diversity, transmission on at least two antennas, reception through at least two antennas, transmission and reception on at least two antennas, up-down conversion mixers, and multiple carriers. A MIMO antenna may also use at least one of the following methods, for example, decorrelation, minimum mean square error (MMSE), and singular value decomposition (SVD). Attenuation may also be used with MIMO antennas and may improve signal-to-noise performance. There are no limitations on where attenuation may be applied in a MIMO antenna signal path. In an exemplary embodiment that may use MIMO antennas, RF attenuation may be placed after the antenna and before any subsequent component associated with the MIMO antenna such that, for example, incoming signals may be attenuated before entering any component or process associated with the MIMO antenna other than the antennas. In another embodiment, RF attenuation may be placed between any RF filter that may follow an antenna and any subsequent component associated with the MIMO antenna such that, for example, incoming signals may be attenuated after entering the antenna and after passing through a filter, but before entering any other component or process associated with the MIMO antenna. In another embodiment, attenuation may be applied after receive signals are converted from an analog signal to a digital signal. In such an embodiment, a processor using digital signal processing algorithms may perform attenuation.

Now turning to attenuation in communication systems where the desired signal strength may be less than the ambient noise level. Communication systems that may transmit and receive with a signal strength that may be near or less than the ambient noise level may be, for example, spread spectrum, and ultra wideband systems. Information on signal and ambient noise levels for ultra wideband systems may be found in IEEE 802.15.3a. The potential signal strength may look like the signals pictured in FIG. 28. Referring to FIG. 28, the y-axis may represent signal strength and the x-axis distance from the receiving antenna. Line 490 may represent ambient noise, which may be of similar signal strength at all relevant distances from the antenna. The signal level of the ambient noise is indicated by line 494. Line 492 may represent the desired signal strength. As described above, applying attenuation in a situation where the noise signal may be stronger than the desired signal may decrease the signal-to-noise ratio; however, using attenuation to limit area of coverage may decrease interference between nearby systems and may improve the performance. For example, circle 496 and 498, of FIG. 29, may represent the areas of coverage of two systems whose signal levels may be less than the level of ambient noise. The areas of coverage may overlap in the area marked 500. The overlap may cause interference in either or both systems. Applying attenuation to the incoming signals of system 496 may result in an area of coverage depicted by circle 502 in FIG. 30. Areas of coverage 498 and 502 may no longer overlap and interference between the systems may decrease. An exemplary embodiment may attenuate incoming signals using wide band attenuation directly after the antenna.

Now turning to the effects of attenuation on communication protocols. Attenuation may directly improve the data throughput of some communication protocols such as, for example, 801.11a/b/g, Bluetooth, and ultra wideband. In a noisy environment, many communication protocols respond by down-training (i.e., decreasing) the speed of communication for all clients in noisy conditions. For example, an 801.22g access point generally attempts to communicate with all clients at its maximum throughput of 54 Mbps. If the 802.11g access point detects a low signal quality caused by at least one of a weak client signal, and a noisy environment, the 802.11g access point decreases its data communication rate to compensate until an acceptable error rate is achieved. The majority of clients may be capable of communicating at maximum speed, but one client affects all clients; therefore, improving the signal for one client may improve the data rate for all clients. Using attenuation to limit the physical range of reception and to improve signal-to-noise ratio may decrease the time the access point may down-train. Any protocol that down-trains may benefit from attenuation. In one embodiment, attenuation may be adjusted on a per client basis.

Now turning to exemplary channel assignment methods. Many radios transmit and receive through antennas using specific channels. A channel may consist of, for example, a specific radio frequency or frequencies, throughput allocation, bandwidth allocation, time allocations, and other methods that enable apparatus to wirelessly send and receive information. Simultaneous transmissions from two or more apparatus using the same channel in substantially the same physical area, or nearby area, may likely interfere with each other. Using different channels to transmit into substantially the same or neighboring area may reduce interference between the transmitting apparatus. Some channels, for example, do not interfere or minimally interfere with each other when used in substantially the same or a nearby area. In one embodiment, wireless cells may use minimally interfering channels to enable multiple radios to transmit and receive simultaneously in substantially the same physical area with reduced interference between adjacent wireless cells. In another embodiment, wireless cells may use minimally interfering channels to enable communication between adjacent wireless cells whose sectors face opposite each other, while reducing interference with adjacent physical sectors. In another embodiment, minimally interfering channels may be used to reduce interference between adjacent and overlapping physical sectors. The number of channels required to reduce interference between adjacent wireless cells, adjacent or overlapping physical sectors, or to enhance communication between adjacent wireless cells depends on, for example, the number of sectors and virtual sectors per wireless cell, cell orientation, and cell placement.

In general, an exemplary approach to reducing interference between adjacent physical sectors, overlapping physical sectors, opposing physical sectors, and adjacent wireless cells may be to assign minimally interfering channels to adjacent, overlapping, and opposing physical sectors. Such a channel assignment embodiment may result in a network communication characteristic that allows each wireless cell to service its clients with less interference from other wireless cells. In another approach, assigning at least one channel that is the same to opposing sectors of adjacent wireless cells while assigning different, possibly minimally interfering channels to adjacent and overlapping physical sectors may enhance communication between adjacent wireless cells. An embodiment that uses at least one common channel in opposing physical and/or virtual sectors results in what may be referred to as a network communication characteristic that may enable inter-cell communication because adjacent wireless cells use the common channel of opposing physical and/or virtual sectors to communicate. Although channel assignments may help reduce interference or enhance communication, other factors that influence the assignment of channels may include, for example, channels used by foreign wireless cells, multi-path interference, client transmit signal strength, signal attenuation behind the antenna, reflected signals, horn signal attenuation, and other factors.

Several channel assignments may be possible for every wireless cell coverage pattern. Time multiplexing techniques may also reduce interference between adjacent, overlapping, or opposing physical sectors that may use the same or similar channels. Some options for assigning channels are discussed for both overlapping and non-overlapping wireless cell coverage patterns. Hardware embodiments capable of supporting the channel assignments are also disclosed. The exemplary channel assignment methods disclosed are not to be construed as limitations.

Diagrams showing exemplary channel assignments use alphanumeric identifiers C1, C2, etc. to represent channels. The identifiers C1, C2, etc. do not represent a specific channel. Any channel may be assigned to the identifier C1, but the same channel is assigned to every physical sector labeled C1. While C1, C2, etc do not necessarily represent specific channels, C1 represents a channel that may be different from and may be minimally interfering with the channel represented by C2. The same rules apply to all channel identifiers.

Figure 35:
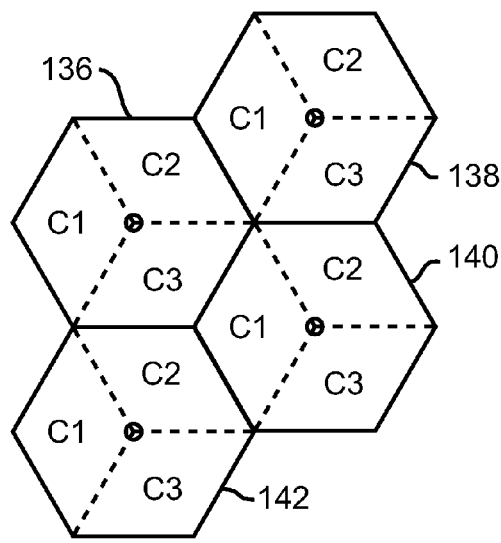
FIG. 35 is a diagram of an exemplary channel assignment pattern for adjacent wireless cells wherein no adjacent or opposing physical sector uses the same channel.
Figure 36:
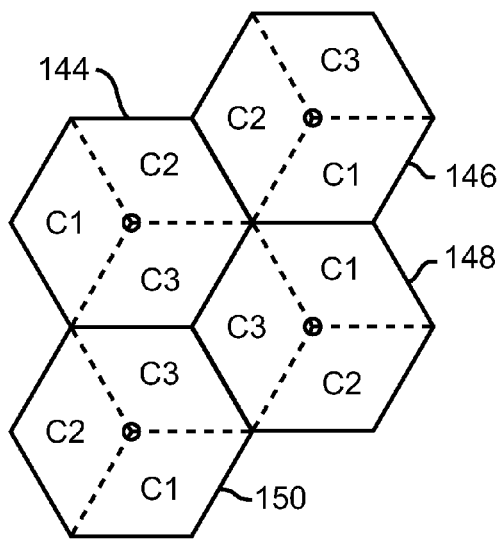
FIG. 36 is a diagram of an exemplary channel assignment pattern for adjacent wireless cells wherein no adjacent wireless cell may use the same channel, but opposing physical sectors do use the same channel.

In general, when assigning channels to physical sectors that may be substantially non-overlapping, the exemplary method of channel assignment to reduce interference is to assign different, minimally interfering channels to adjacent, and opposing physical sectors. However, when seeking to enhance communication between adjacent wireless cells, the exemplary method of channel assignment is to assign the same or similar channels to opposing physical sectors. Exemplary wireless cells 128, 130, 132, and 134 in FIG. 31 through FIG. 34 show possible channel assignments patterns for wireless cells with substantially non-overlapping physical sectors. Although each physical sector is serviced by a directional antenna that naturally reduces to some extent the interference between adjacent sectors, adjacent sectors may also be assigned different minimally interfering channels to possibly reduce interference. The exemplary channel assignment patterns of wireless cell 132 in FIG. 33 reuses channels C1 and C2; whereas, the exemplary pattern of wireless cells 128, 130, and 134 do not. Replication of exemplary pattern and exemplary wireless cell shape 128 may produce, for example, adjacent wireless cells 136, 138, 140, and 142, as shown in FIG. 35, where no opposing sector uses the same channel. Using a different, minimally interfering channel in each opposing sector may allow each wireless cell to service its respective clients with minimal interference from adjacent or nearby wireless cells. At the same time, assigning different channels to opposing sectors may preclude efficient wireless communication between adjacent or nearby wireless cells. In another example, assigning the same or similar channels to opposing sectors, as shown in FIG. 36, may enable adjacent wireless cells 144, 146, 148, and 150 to communicate wirelessly, but the channel assignment may also increase interference between cells when a cell services its clients. Channel assignment plays a part in network formation and determines network communication characteristics, which is discussed below.

Figure 37:
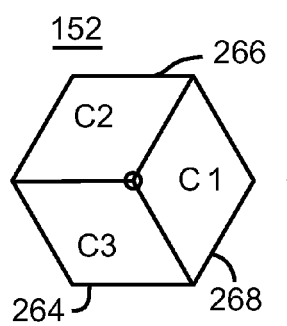
FIG. 37 is a diagram of an exemplary channel assignment pattern using three channels for a wireless cell with a shape of coverage similar to a hexagon.
Figure 38:
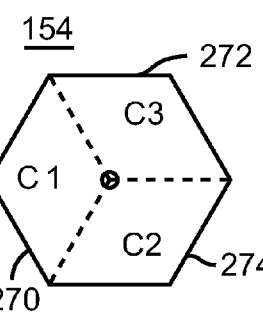
FIG. 38 is a diagram of an exemplary channel assignment pattern using three channels for a wireless cell with a shape of coverage similar to a hexagon, but with different orientation than the hexagon wireless cell of FIG. 37.
Figure 39:
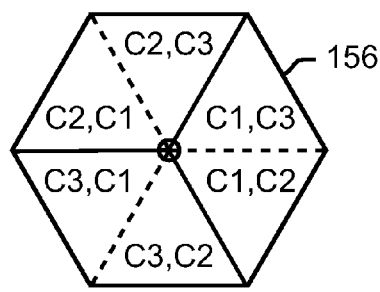
FIG. 39 is a diagram of an exemplary channel assignment pattern that may result when the wireless cell channel assignment patterns of FIG. 37 and FIG. 38 are superimposed.

There are no limitations on assigning channels to overlapping sectors. Antennas may be arranged so that their physical sectors overlap by any amount and any channel may be assigned to any physical sector. In general, when assigning channels to physical sectors that may overlap, the exemplary method of channel assignment to reduce interference is to assign different, minimally interfering channels to adjacent, overlapping, and opposing physical sectors. However, when seeking to enhance communication between adjacent wireless cells, the exemplary method of channel assignment is to assign at least one channel that is the same or similar to opposing physical sectors. In one embodiment, individual physical sectors with similar angle and area of coverage may overlap other sectors of similar angle and area of coverage by about 50%. Two exemplary wireless cells 152 and 154 with substantially non-overlapping sectors each assigned with different, possibly minimally interfering channels are shown in FIG. 37 and FIG. 38 respectively. Each physical sector of exemplary wireless cells 152 and 154 may have an angle of coverage of about 120 degrees. However, the physical sectors of wireless cell 152 may have a different orientation when compared to the physical sectors of wireless cell 154; therefore, when wireless cell 152 is superimposed over wireless cell 154 each physical sector of wireless cell 152 may overlap at least one physical sector of wireless cell 154. FIG. 39 shows the superposition of wireless cells 152 and 154 to form exemplary wireless cell 156 wherein each physical sector of wireless 152 may overlap two adjacent physical sectors of wireless cell 154 by about 50%. In wireless cell 156 of FIG. 39, each adjacent physical sector may have a different, possibly minimally interfering channel and the channel of each overlapping physical sector may be a different, possibly minimally interfering channels from the channel assigned to the physical sector that is overlapped. As a result, the channel coverage pattern of exemplary wireless cell 156 has at least two different, possibly minimally interfering channels in each virtual sector.

Figures 40, 41:
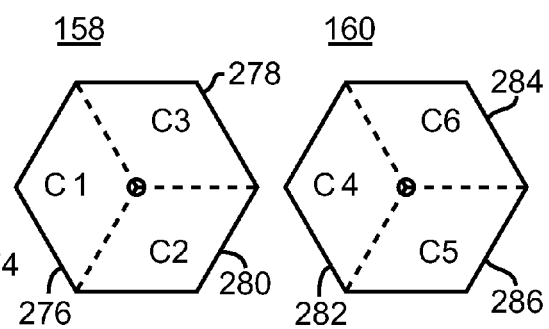
FIG. 40 is a diagram of an exemplary channel assignment pattern using three channels for a wireless cell with a shape of coverage similar to a hexagon.
FIG. 41 is a diagram of an exemplary channel assignment pattern using three channels for a wireless cell with a shape of coverage similar to a hexagon, but with similar orientation than the hexagon wireless cell of FIG. 40.

Another example of overlapping physical sectors and channel assignments is another embodiment where sectors having substantially equal angle of coverage, area of coverage, and orientation overlap by about 100%. The exemplary wireless cells 158 and 160 of FIG. 40 and FIG. 41 each have three physical sectors with an angle of coverage of about 120 degrees. Each physical sector of exemplary wireless cells 158 and 160 may be assigned a different, possibly minimally interfering channel. Additionally, wireless cells 158 and 160 may have similar orientation; therefore, superimposing exemplary wireless cells 158 and 160 may form the channel assignment pattern of exemplary wireless cell 162 of FIG. 42. Wireless cell 162 has six, about 120-degree physical sectors wherein each physical sector is substantially overlapped by about 100% by one other physical sector resulting in three virtual sectors of about 120-degree angle of coverage and different, possibly minimally interfering channels.

Figure 43:
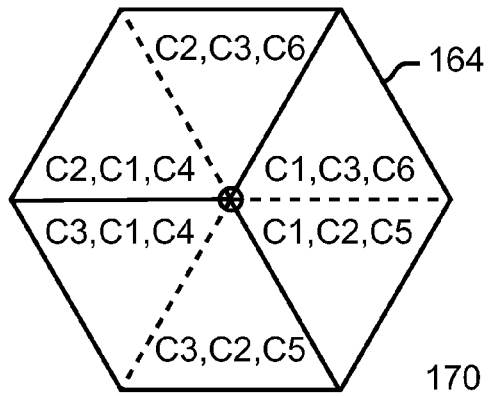
FIG. 43 is a diagram of an exemplary channel assignment pattern that may result when the wireless cell channel assignment patterns of FIG. 39 and FIG. 41 are superimposed.

Wireless cells 156 and 162 are only examples. There are no limitations on, for example, the number of physical sectors, the channel assignment of the physical sectors, the amount of overlap of the physical sectors, the number of sectors that may overlap, the number of channels assigned, or the orientation of the cells. The physical sectors do not have to be of substantially equal angle or area of coverage. In one embodiment, the physical sector of an omni-directional antenna may overlap the physical sectors of wireless cell 152. In other embodiments, the physical sector of an omni-directional antenna may overlap the physical sectors of any one of wireless cells 154, 158, and 160. In another embodiment, wireless cell 160 of FIG. 41 may superimpose wireless cell 156 of FIG. 39 resulting in an exemplary channel assignment pattern of FIG. 43. The amount of overlap between sectors does not have to be uniform. There are no requirements or limitations on the angle of coverage of the wireless cell. Exemplary cells 152 through 164 inclusive show wireless cell angle of coverage of about 360 degrees; however, a wireless cell may have any angle of coverage. Further, there are no limitations on the number of physical sectors that may overlap. Any number of physical sectors with any assigned channel may overlap by any amount. There are no limitations that a physical sector must stay in a fixed position. The position, angle of coverage, or area of coverage of a physical sector and/or wireless cell may be changed at any time and in any manner, whether the manner of making change be at least one of electronic, mechanical, and manual methods. As discussed above, there are no limitations on the number of antennas that may service a physical sector; however, each antenna that services a physical sector may use the channel assigned to the physical sector. When physical sectors overlap by about 100%, the antenna or antennas of each individual physical sector may retain independent function and may retain their assigned channels.

Figure 44:
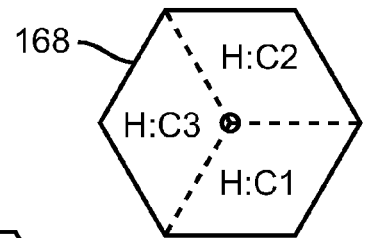
FIG. 44 is a diagram of an exemplary channel assignment pattern using three channels assigned to horizontally polarized antennas for a wireless cell with a shape of coverage similar to a hexagon.
Figure 45:
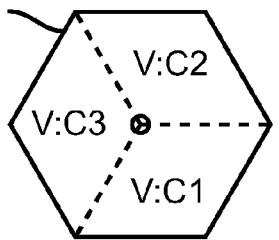
FIG. 45 is a diagram of an exemplary channel assignment pattern using three channels assigned to vertically polarized antennas for a wireless cell with a shape of coverage similar to a hexagon.

Now turning to exemplary channel assignments for orthogonal polarized antennas. Horizontally and vertically polarized antennas may provide additional degrees of freedom when assigning channels. The terms horizontal and vertical polarization are not referenced to the ground. A horizontally polarized antenna may be placed in any position. The vertically polarized antenna is positioned substantially orthogonal to the horizontal antenna. The antennas of exemplary wireless cells 168 and 170, shown in FIG. 44 and FIG. 45, may be horizontally and vertically polarized respectively. Both cells may have similar physical sector orientation and the physical sectors with similar orientation may be assigned the same or similar channel. Superimposing wireless cells 168 and 170 may produce wireless cell 172 where the antennas of each virtual sector may work independently and may minimally interfere with each other, yet use the same or similar channel.

In general, to potentially reduce interference, the exemplary method of assigning channels to physical sectors serviced by polarized antennas is to assign adjacent, overlapping, and opposing physical sectors serviced by horizontally polarized antennas to different, possibly minimally interfering channels and to assign adjacent, overlapping, and opposing physical sectors serviced by vertically polarized antennas to different, possibly minimally interfering channels. The channels assigned to the physical sectors serviced by horizontally polarized antennas may be the same channels assigned to the physical sectors serviced by vertically polarized antennas. Additionally, to potentially enhance communication between adjacent wireless cells, the exemplary method of assigning channels to physical sectors serviced by polarized antennas is to assign opposing physical sectors serviced by horizontally polarized antennas to the same or similar channels and to assign opposing physical sectors serviced by vertically polarized antennas to the same or similar channels. The channels assigned to the physical sectors serviced by horizontally polarized antennas may be the same channels assigned to the physical sectors serviced by vertically polarized antennas.

Figure 47:
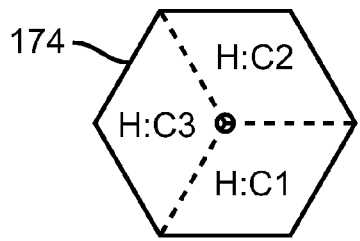
FIG. 47 is a diagram of an exemplary channel assignment pattern using three channels assigned to horizontally polarized antennas for a wireless cell with a shape of coverage similar to a hexagon.
Figure 48:
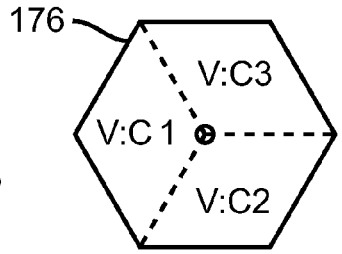
FIG. 48 is a diagram of an exemplary channel assignment pattern using three channels assigned to vertically polarized antennas for a wireless cell with a shape of coverage similar to a hexagon.
Figure 49:
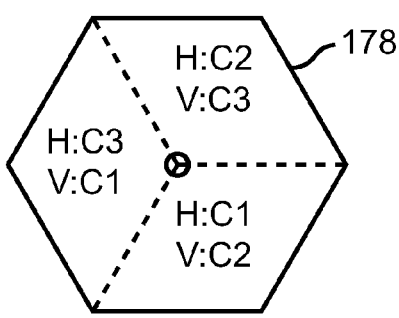
FIG. 49 is a diagram of an exemplary channel assignment pattern that may result when the wireless cell channel assignment patterns of FIG. 47 and FIG. 48 are superimposed.
Figure 50:
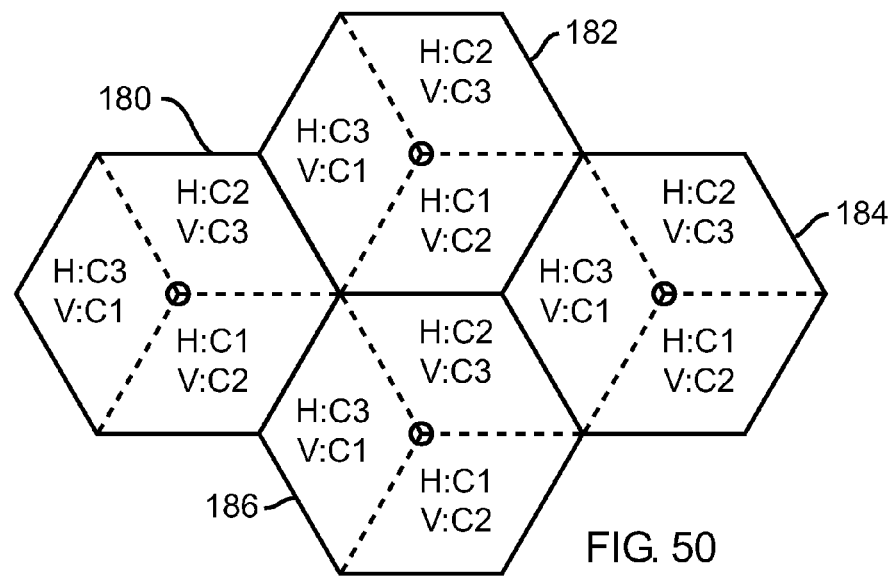
FIG. 50 is a diagram of an exemplary channel assignment pattern formed by replicating channel assignment pattern of FIG. 49 with similar orientation resulting in adjacent wireless cells wherein no adjacent physical or virtual sector or opposing virtual sector of similar polarization uses the same channel.
Figure 51:
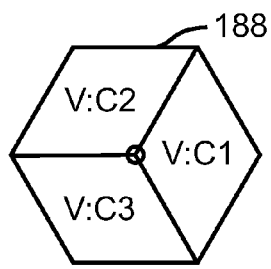
FIG. 51 is a diagram of an exemplary channel assignment pattern using three channels assigned to vertically polarized antennas for a wireless cell with a shape of coverage similar to a hexagon.
Figure 52:
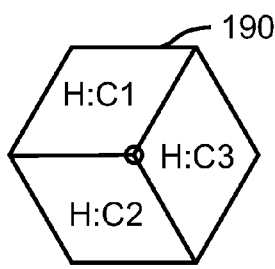
FIG. 52 is a diagram of an exemplary channel assignment pattern using three channels assigned to horizontally polarized antennas for a wireless cell with a shape of coverage similar to a hexagon.
Figure 53:
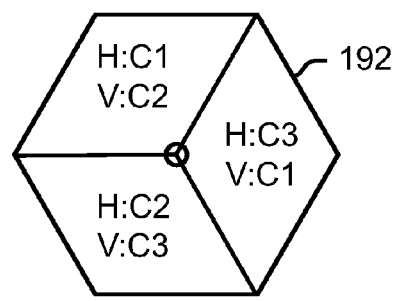
FIG. 53 is a diagram of an exemplary channel assignment pattern that may result when the wireless cell channel assignment patterns of FIG. 51 and FIG. 52 are superimposed.
Figure 54:
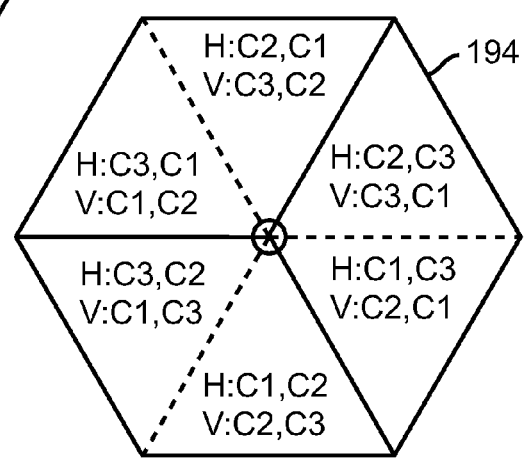
FIG. 54 is a diagram of an exemplary channel assignment pattern that may result when the wireless cell channel assignment patterns of FIG. 49 and FIG. 53 are superimposed.
Figure 55:
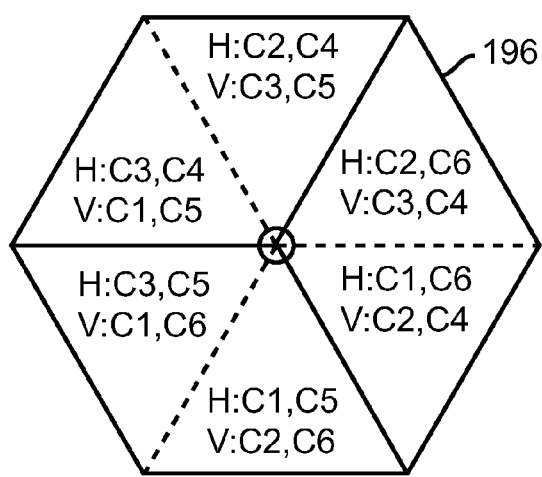
FIG. 55 is a diagram of an exemplary channel assignment pattern using six channels assigned to horizontally and vertically polarized antennas for a wireless cell with a shape of coverage similar to a hexagon.

In another embodiment, different, possibly minimally interfering channels are assigned to physical sectors that may overlap even though the overlapping physical sectors are serviced by horizontally and vertically polarized antennas. Exemplary wireless cell 174, of FIG. 47, uses horizontally polarized antennas and wireless cell 176, of FIG. 48, uses vertically polarized antennas. The physical sectors of wireless cells 174 and 176 have similar orientation, but may have different channel assignments. Superimposing wireless cells 174 and 176 results in the exemplary channel assignment of wireless cell 178 of FIG. 49. Wireless cell 178 is an embodiment where no horizontally or vertically polarized antenna of adjacent physical sectors may be assigned the same channel. Each overlapping physical sector may have a different, possibly non-interfering channel assigned. The result of replicating wireless cell 178 while substantially maintaining its orientation is shown as a network embodiment in FIG. 50. Each opposing virtual sector of wireless cells 180, 182, 184, and 186 may use different, possibly minimally interfering channels on antennas of similar polarization. Such an arrangement may reduce interference between opposing sectors. Similar techniques may be used to assign channels to horizontally and vertically polarized antennas where physical sectors may overlap. In one embodiment, the physical sectors overlap by about 50%. The channel assignment embodiment of wireless cell 194 of FIG. 54 may result when wireless cell embodiments 192 (an embodiment that may result by superimposing wireless cells 188 and 190 of FIG. 51 and FIG. 52 respectively) and embodiment 178, of FIG. 49 and FIG. 53 respectively, are superimposed. When wireless cells 178 and 192 are superimposed, their respective virtual sectors may overlap by about 50%. Another embodiment, wireless cell 196 in FIG. 55, is produced in a manner similar to wireless cell embodiment 194, except six minimally interfering channels may be assigned instead of three.

Figure 56:
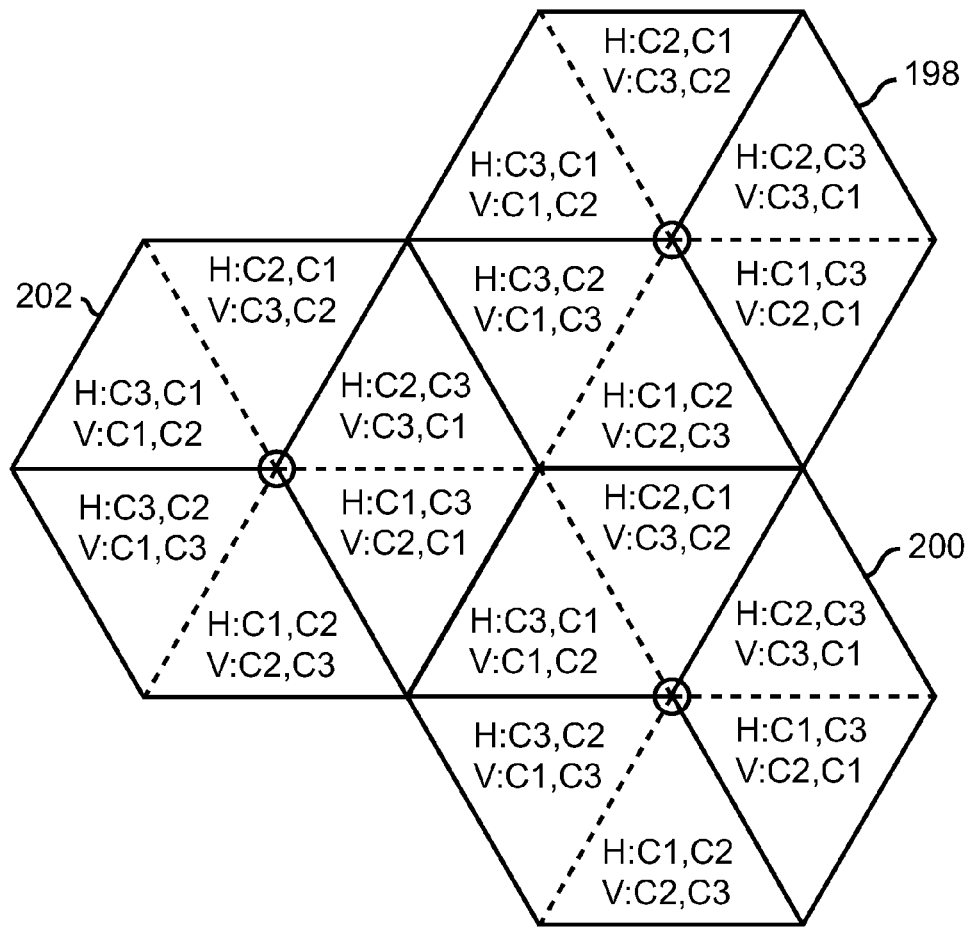
FIG. 56 is a diagram of an exemplary channel assignment pattern formed by replicating channel assignment pattern of FIG. 54 with similar orientation resulting in adjacent wireless cells wherein adjacent physical sectors or opposing virtual sectors of similar polarization may uses the same channel.
Figure 57:
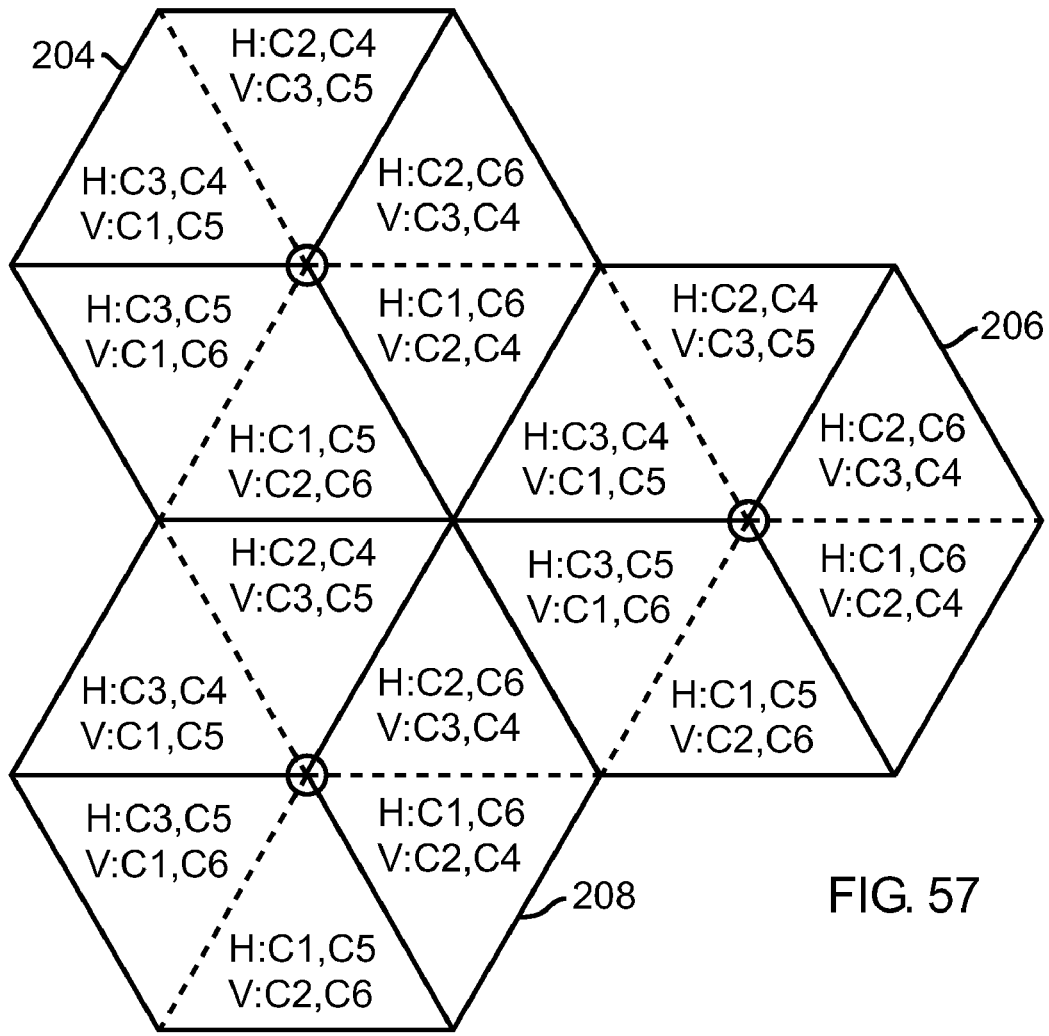
FIG. 57 is a diagram of an exemplary channel assignment pattern formed by replicating channel assignment pattern of FIG. 55 with similar orientation resulting in adjacent wireless cells wherein no adjacent physical sector or opposing virtual sector of similar polarization uses the same channel.

An network embodiment may be formed by replicating and placing copies of wireless cell 194 into substantially adjacent positions while maintaining substantially the same orientation as shown in FIG. 56. The horizontally and vertically polarized antennas of opposing sectors of each wireless cell 198, 200, and 202 may use the same or similar channels, which may make the network more suited for inter-cell communication and less suited for servicing clients. The ability of wireless cells to communicate with adjacent or nearby wireless cells and the ability of a wireless cell to service clients with less interference with adjacent or nearby wireless cells may be referred to a network communication characteristics. Another network embodiment may be formed by replicating and placing copies of wireless cell 196 into substantially adjacent positions while maintaining substantially the same orientation as shown in FIG. 57. Horizontally polarized channels in opposing sectors may use different channels and vertically polarized antennas in opposing sectors may use different channels; therefore, the network may be better suited to allow wireless cells 204, 206, and 208 to service clients than to provide inter-cell communication. Channel assignments for wireless cells and networks using horizontally and vertically polarized antennas are not limited to the examples shown. Increasing the number of minimally interfering channels may increase the number of channel assignment combinations.

Channel assignment patterns may also be dynamically altered. The ability to dynamically alter the channel assignment of one or many wireless cells may allow a wireless cell, a collection of wireless cells, or a network of wireless cells to adapt to, for example, increased client demand, increased network routing demand, new sources of interference, and environmental limitations. The network embodiments of FIG. 35 and FIG. 36 provide insight into the value of dynamically changing channel assignment patterns. The channel assignment pattern of wireless cells 136, 138, 140, and 142 of FIG. 35 may enable each wireless cell to communicate with its respective clients with reduced interference to/from adjacent cells, but may not support efficient communication between wireless cells because opposing sectors use different channels. The channel assignment patterns of the network embodiment of FIG. 36 may enable wireless cells 144, 146, 148, and 150 to communicate with each other, but not effectively with their clients without interfering with/from an opposing sector because each opposing sector are assigned the same channel. Dynamically switching between the pattern embodiments of FIG. 35 and FIG. 36, or the patterns shown in FIG. 57 and FIG. 56 (for embodiments with orthogonal polarized cells), may allow the wireless cells to alternately service clients and to communicate with each other. The change in channel pattern may be triggered by any condition such as, for example, a fixed time interval, client demand for service, or wireless cell demand for inter-cell communication.

Now turning to exemplary hardware embodiments. Hardware embodiments may combine devices to form wireless cells. Various embodiments of hardware may include, for example, overlapping and non-overlapping sectors, channel assignment patterns that may decrease interference or that may enable inter-cell communication, and attenuation that may reduce interference. Hardware configurations that may provide overlapping physical sectors, non-overlapping physical sectors, channel assignments, or attenuation are not limited to the embodiments shown. There are no limitations on, for example, the number of radios, processors, RF switches, packet switches, antenna sharing devices (ASD), attenuators, and antennas in a wireless cell. The explanation of hardware embodiments may include, for example, a description of how antennas may be positioned to achieve overlapping and non-overlapping physical sector coverage, how channel assignments may be implemented by the hardware, and several embodiments that may include attenuation devices.

The placement of the physical sectors, whether they overlap or do not overlap, may depend on the antennas' positions and their angle of coverage. In one embodiment, three antennas with about a 120-degree angle of coverage may be positioned to provide the substantially non-overlapping coverage shown in FIG. 5. Each antenna physical sector may substantially correspond to one of the physical sectors 20, 22, and 24. In another embodiment, the physical sectors of three antennas may be arranged to substantially provide the coverage show in FIG. 7. In another embodiment, the physical sectors of six antennas may be positioned to substantially provide the overlapping coverage shown in FIG. 9 or FIG. 42. In another embodiment, four antennas may be arranged to substantially provide the non-overlapping coverage of FIG. 11. The positioning of the antenna physical sectors is not limited to 360-degree coverage and/or overlaps of physical sectors of about 50%, or about 100%. The antennas of a wireless cell may be arranged to provide any angle of coverage with any amount of overlap or open space between non-overlapping physical sectors.

Figure 42:
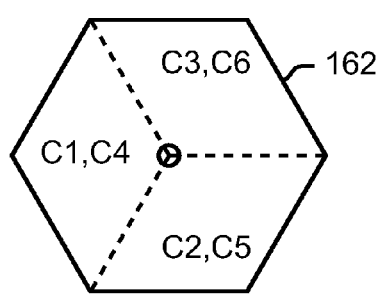
FIG. 42 is a diagram of an exemplary channel assignment pattern that may result when the wireless cell channel assignment patterns of FIG. 40 and FIG. 41 are superimposed.
Figure 67:
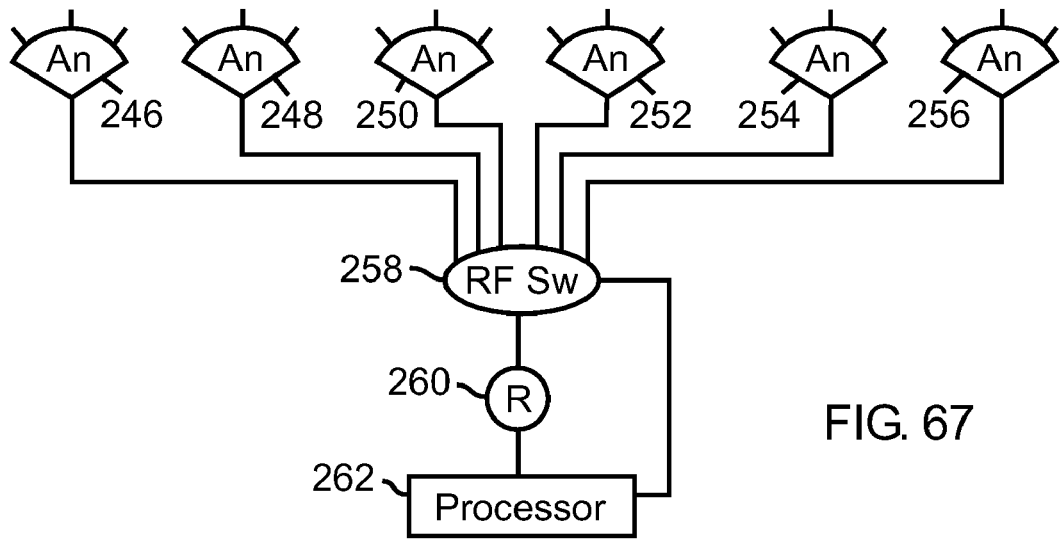
FIG. 67 is a diagram of an exemplary six antenna, one radio, one RF switch wireless cell.

Referring to the hardware embodiment shown in FIG. 67, the overlapping coverage of FIG. 39 may be achieved using this hardware embodiment by substantially positioning each antenna 246, 248, 250, 252, 254, and 256 in any one of the physical sector positions shown together in FIG. 39 and separately in FIG. 37 and FIG. 38. Any antenna (or antenna array as described above) may be placed in any one of the physical sector positions 264, 266, 268, 270, 272, or 274. In one embodiment, antennas 246, 248, 250, 252, 254, and 256 may be positioned to correspond to physical sector positions 264, 266, 268, 270, 272, and 274 respectively. In another embodiment, antennas 246, 248, 250, 252, 254, and 256 may be positioned to correspond to physical sector positions 266, 268, 264, 272, 274, and 270 respectively. Various other antenna physical sectors arrangements may exist. In another embodiment, substantially overlapping coverage of about 100%, as shown in FIG. 42, may be achieved using the hardware embodiment of FIG. 67 by substantially positioning antennas 246, 248, 250, 252, 254, and 256 in one of the physical sector positions shown together in FIG. 42 and separately in FIG. 40 and FIG. 41. Any single antenna (or antenna array as described above) may be placed in any one of the physical sector positions 276, 278, 280, 282, 284, and 286. In one embodiment, antennas 246, 248, 250, 252, 254, and 256 may be positioned to correspond to physical sector positions 276, 278, 280, 282, 284, and 286 respectively. In another embodiment, antennas 246, 248, 250, 252, 254, and 256 may be positioned to correspond to physical sector positions 278, 280, 276, 286, 284, and 282 respectively. Various other antenna physical sectors arrangements may exist.

Generally, channel assignments may be associated with the physical sector of an antenna. For example, referring to FIG. 37, the three physical sectors, 264, 266, and 268, of wireless cell 152 may be assigned channels C3, C2, and C1 respectively. Each antenna of a hardware embodiment that may provide coverage to a physical sector must use the channel assigned to the physical sector. Because each antenna may be required to use a specific channel to conform to the channel assignment pattern, the radio connected to a specific antenna may also be required to use the same channel. In an exemplary hardware embodiment, referring to FIG. 65, a radio is exclusively connected to each antenna. The physical sector of each antenna may be assigned a specific channel. Each radio uses the channel assigned to the antenna physical sector to which the radio may be connected. The radio does not change its channel unless the channel assigned to the antenna physical sector is changed. In another embodiment, still referring to FIG. 65, antennas 246, 248, and 250 may be positioned to service physical sectors 264, 266, and 268 of FIG. 37 respectively. When the antennas are positioned as such, radios 252, 254, and 256 may be set to channels C3, C2, and C1 respectively. In another hardware embodiment, antennas 246, 248, and 250 may be positioned to service physical sectors 268, 266, and 264 of FIG. 37 respectively. When the antennas are positioned as such, radios 252, 254, and 256 may be set to channels C1, C2, and C3 respectively. In another hardware embodiment, referring to FIG. 66, one radio 260 services multiple antennas. The physical sector of each antenna 246, 248, and 250 may be assigned a channel. When the radio is connected to an antenna through RF switch 258, the radio may change its channel to conform to the channel assigned to that antenna's physical sector. In one embodiment, referring to FIG. 66, antennas 246, 248, and 250 may be positioned to service physical sectors 264, 266, and 268 of FIG. 37 respectively. Radio 260 may set its channel to C3, C2, and C1 when connected through RF switch 258 to antennas 246, 248 and 250 respectively. In another embodiment, still referring to FIG. 66, antennas 246, 248, and 250 may be positioned to service physical sectors 268, 266, and 264 of FIG. 37 respectively. Radio 260 may set its channel to C1, C2, and C3 when connected through RF switch 258 to antennas 246, 248 and 250 respectively.

As discussed above, attenuation may be performed at any point in a signal path and by a variety of methods, for example, using hardware and/or a combination of hardware and software. More particularly, attenuation may be done by, for example, with discrete hardware adapted to attenuate signals, by a processor using software signal processing algorithms, or by physical means such as by placing an attenuating material in front of an antenna. In one embodiment, bi-directional RF attenuators may be used. In another embodiment, digitally adjustable RF attenuators may be used. In another embodiment, digitally adjustable attenuators are integrated into a radio. Attenuation may be applied to at least one of transmit and receive signals, transmit signals, or receive signals. The attenuation may be fixed or variable. Variable attenuation may be adjusted to different settings at different times and/or under predetermined circumstances.

Figure 58:
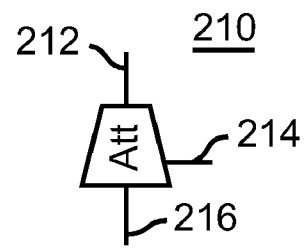
FIG. 58 is a diagram of an exemplary attenuation device.

More specifically, for example, attenuation may be adjusted between data transmit and receive transitions, between client communication transitions, or between channel assignment transitions. In an exemplary embodiment, the attenuation may be adjustable and controlled by the processor. The interface to adjust the attenuation may be analog, digital, or manual. The symbol 210 of FIG. 58 represents a device that attenuates and may be referred to as an attenuation device. The attenuation device represents any method of attenuation whether performed by, for example, hardware and/or by signal processing techniques. Attenuation by hardware and/or signal processing may require at least a processor and signal processing algorithms executed by the processor; however, such attenuation techniques may also require, for example, analog-to-digital, digital-to-analog converters, and similar hardware. The attenuation device may perform bi-directional and/or uni-directional attenuation. In a bidirectional mode of operation, any signal impressed on path 216 may appear on path 212 in attenuated form and signal placed on path 212 may appear on path 216 in attenuated form. If the attenuation is adjustable, adjustments may be made using adjustment path 214. Adjustments to the attenuation increase or decrease the amount a signal may be attenuated. Paths 212, 216, and adjustment path 214 may have any signal level, format, voltage level, impedance, or characteristics that may be necessary to interface with other devices. Several attenuation module embodiments that may use the attenuation device are described below and are represented as a block in the hardware embodiments.

Figure 59:
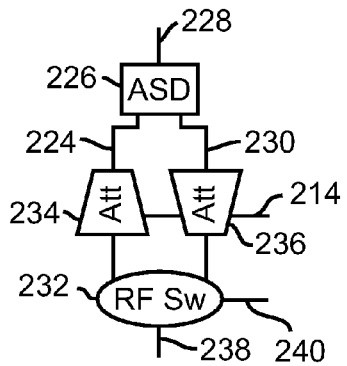
FIG. 59 is a diagram of an exemplary attenuation module with an attenuation device in transmit and receive path, an ASD, and an RF switch.

The first attenuation module embodiment, referring to FIG. 59, combines two attenuation devices, 234 and 236, with an antenna-sharing device (ASD) 226, and an RF switch 232. RF switch 232 may select either the transmit path 224 or the receive path 230. Selecting the transmit path 224 may allow signals introduced on path 238 to pass through attenuation device 234 to path 228. Selecting the receive path 230 may allow signals on path 228 to pass through attenuation device 236 to path 238. Path selection through RF switch 232 may be controlled by selection path 240. In an exemplary embodiment, selection path 240 may be connected to and controlled by a processor. In another embodiment, selection path 240 may be controlled by a radio. Adjustment path 214 may adjust the attenuation of attenuation devices 234 and 236. In an exemplary embodiment, adjustment path 214 may adjust the attenuation of attenuation device 234 independent of attenuation device 236, which may enable the transmit and receive signals to be attenuated by different amounts. The ASD may combine the signal on path 224 and the signal on path 230 onto path 228. The ASD's function may alternately be referred to as splitting the combined transmit and receive signals of path 228 into separate transmit signals on path 224 and separate receive signals on path 230. Generally, path 228 may connect to a device capable of using a combined transmit and receive signal such as, for example, an antenna or RF switch.

Figure 60:
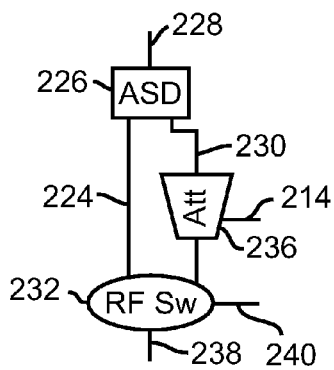
FIG. 60 is a diagram of an exemplary attenuation module with an attenuation device in the receive path, an ASD, and an RF switch.

The second attenuation module embodiment, referring to FIG. 60, is similar to the first attenuation module embodiment in that it has an ASD, attenuation device in the receive path, and an RF switch; however, the second attenuation module embodiment may be different in that, for example, there is no attenuation device in transmit path 224.

Figure 61:
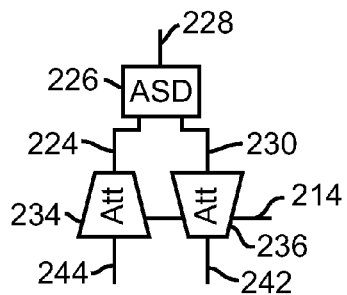
FIG. 61 is a diagram of an exemplary attenuation module with an attenuation device in transmit and receive path, and an ASD.

The third attenuation module embodiment, referring to FIG. 61, is similar to the first attenuation module embodiment in that it has an ASD, an attenuation device in the transmit and receive paths; however, the third attenuation module embodiment may be different in that, for example, it does not have an RF switch. Removing the RF switch may provide separate access to transmit path 244 and receive path 242. Generally, transmit path 244 and receive path 242 may be connected, for example, to an RF switch and/or to a radio capable of connecting to separate transmit and receive signals.

Figure 62:
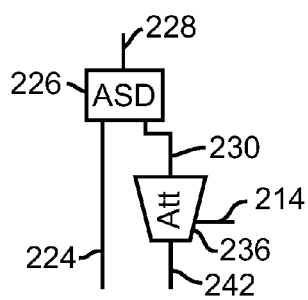
FIG. 62 is a diagram of an exemplary attenuation module with an attenuation device in the receive path, and an ASD.

The fourth attenuation module embodiment, referring to FIG. 62, is similar to the second attenuation module embodiment in that it has an ASD and an attenuation device in the receive path; however, the fourth embodiment may be different in that, for example, there is no RF switch. Generally, transmit path 224 and receive path 242 may be connected, for example, to an RF switch and/or to a radio capable of connecting to separate transmit and receive signals.

Figure 63:
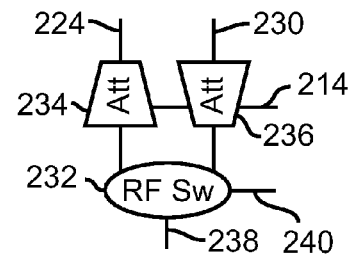
FIG. 63 is a diagram of an exemplary attenuation module with an attenuation device in transmit and receive path, and an RF switch.

The fifth attenuation module embodiment, referring to FIG. 63, is similar to the first attenuation module embodiment in that it has an attenuation device in the transmit and receive paths, and an RF switch; however, the fifth embodiment may be different in that, for example, it does not have an ASD. Generally, transmit path 224 and receive path 230 may connect to, for example, an RF switch and/or another device capable of connecting to separate transmit and receive signals.

Figure 64:
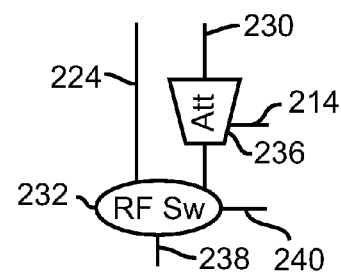
FIG. 64 is a diagram of an exemplary attenuation module with an attenuation device in the receive path, and an RF switch.

The sixth attenuation module embodiment, referring to FIG. 64, is similar to the second attenuation module embodiment in that it has an attenuation device in the receive path and an RF switch; however, the sixth embodiment may be different in that, for example, there is no ASD. Generally, transmit path 224 and receive path 230 may be connected, for example, to an RF switch and/or to a radio, and another device capable of connecting to separate transmit and receive signals.

The seventh attenuation module embodiment is similar to the first attenuation module embodiment in that it has an attenuation device in the transmit and receive paths; however, the seventh embodiment may be different in that, for example, there is no ASD and no RF switch.

The eighth attenuation module embodiment, referring to FIG. 64, is similar to the second attenuation module embodiment in that it has an attenuation device in the receive path; however, the eighth attenuation module embodiment may be different in that, for example, there is no ASD and no RF switch.

Now turning to hardware embodiments. Hardware embodiments combine, for example, antennas, radios, RF switches, packet switches, attenuation module, processors, digital signal processing, horns, and other devices to form wireless cells. The antennas of any hardware embodiment may be positioned to provide the desired physical sector coverage. The number of antennas required for any hardware embodiment may depend on the number of physical sectors covered by the wireless cell.

The various embodiments described below are not exhaustive or limiting. As discussed above, the symbol for an antenna in the drawings may be a single antenna or multiple antennas that may be arranged to work in a coordinated manner to service a physical sector. There are no limitations on the number of antennas in a hardware embodiment. In an exemplary embodiment, the number of antennas may correspond to the number of physical sectors desired in the wireless cell coverage pattern. There is no limitation on the angle and/or area of coverage of each antenna. In one embodiment, each antenna may provide the same angle and/or area of coverage. The combine angle and area of coverage of all antennas of a wireless cell may be of any value ranging from just over about zero degrees to about 360 degrees. There are no limitations on the type of coverage. The type of coverage may be overlapping or non-overlapping for any hardware embodiment. Non-overlapping physical sectors are not required to be adjacent and/or substantially adjacent. In one embodiment, physical sectors are substantially adjacent and do not substantially overlap. The amount of overlap of physical sectors in an overlapping coverage arrangement does not have to be uniform for all antennas. In one embodiment, each physical sector overlaps at least one other physical sector by about 50%. In an exemplary embodiment, hardware that does not use attenuation may have an overlapping physical sector arrangement. Hardware embodiments capable of attenuation may use either overlapping and/or non-overlapping physical sector coverage patterns.

There are no limitations on the number of radios in any embodiment. In exemplary embodiments where each antenna may be serviced by a dedicated radio, the number of radios may be the same as the number of antennas. In other embodiments where the antennas may not be exclusively serviced by a radio, the number of radios may be increased or decreased from what is described. The radios in exemplary embodiments may be capable of operating on more than one channel. The processor, in exemplary embodiments, in addition to getting receive data from and sending transmit data to the radios, may also send instructions to control the radios such as, for example, instructing a radio to change channels or getting control information from the radios. In exemplary embodiments, the processor may also be capable of, for example, varying attenuation, controlling any or all RF switches, maintaining route tables, maintaining client specific information, and handing off mobile clients. In an exemplary embodiment, the processor may also control, for example, the attenuation or RF switches on a transmit or receive basis, a per client basis, a fixed period basis, and on a per demand basis. Some embodiments may have a network IO connection that may enable the wireless cell to communicate with a wired network. Some embodiments may have local storage to store, for example, transmit and receive date, relay data, video or audio data, environmental conditions data, and any other type of data required to service clients, function as a network, handoff or receive mobile clients, and forward information.

A first hardware embodiment, referring to FIG. 67, uses six antennas 246, 248, 250, 252, 254, and 256, an RF switch 258, a radio 260, and a processor 262. The exemplary antenna arrangement for the first hardware embodiment is overlapping. The processor may control the RF switch. In other embodiments, the radio may control the RF switch. The RF switch may connect the radio to any antenna, 246, 248, 250, 252, 254, or 256. In the first hardware embodiment, the radio connects to only one antenna at a time. In other embodiments, the radio may connect to multiple antennas at a time. In the first embodiment, each antenna physical sector may be assigned a channel. The radio operates on the channel assigned to the physical sector of the antenna to which the radio may be connected.

Figure 46:
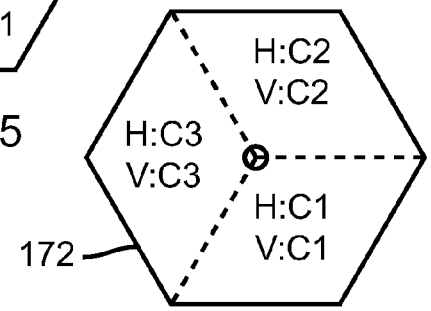
FIG. 46 is a diagram of an exemplary channel assignment pattern that may result when the wireless cell channel assignment patterns of FIG. 44 and FIG. 45 are superimposed.

The first hardware embodiment may support exemplary channel assignment pattern of FIG. 39 or FIG. 42. As described above, channel assignment patterns of wireless cells 152 and 154 of FIG. 37 and FIG. 38 may superimpose to produce the pattern of FIG. 39. Any antenna of the first hardware embodiment may be positioned to service any one of physical sectors 264, 266, 268, 270, 272, and 274. One possible mapping of antennas to physical sectors may be to position antennas 246, 248, 250, 252, 254, and 256 to service physical sectors 264, 266, 268, 270, 272, and 274 respectively. Using this exemplary mapping of antennas to physical sectors requires radio 260 to operate on channel C3, C2, C1, C1, C3, and C2 when connected to antennas 246, 248, 250, 252, 254, and 256 respectively. Also described above, the exemplary channel assignment patterns of wireless cells 158 and 160 may superimpose to produce the pattern of FIG. 42. Any antenna of the first hardware embodiment may be positioned to service any one of physical sectors 276, 278, 280, 282, 284, or 286. One possible mapping of antennas to physical sectors may be to position antennas 246, 248, 250, 252, 254, and 256 to service physical sectors 276, 278, 280, 282, 284, and 286 respectively. Using this exemplary mapping requires radio 260 to operate on channel C1, C3, C2, C4, C6, and C5 when connected to antennas 246, 248, 250, 252, 254, and 256 respectively. Another embodiment wherein three antennas are horizontally polarized and three antennas are vertically polarized may support the channel assignment pattern of FIG. 46, FIG. 49, and FIG. 53.

Figure 68:
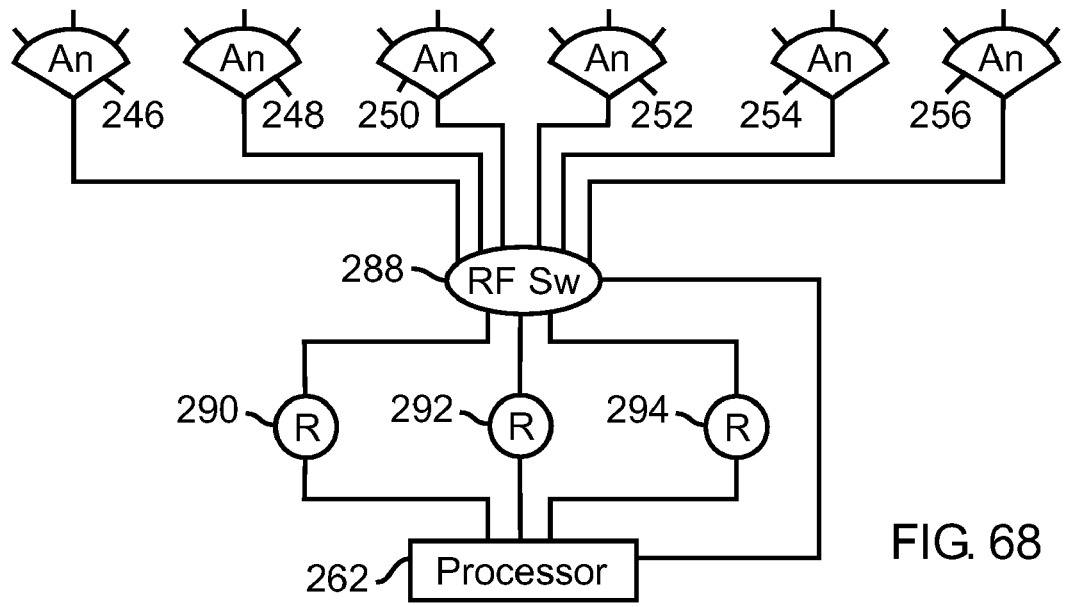
FIG. 68 is a diagram of an exemplary six antenna, three radio, one RF switch wireless cell.

A second hardware embodiment, referring to FIG. 68, is similar to the first hardware embodiment in that the second embodiment uses six antennas, an RF switch, a processor, and may have a variety of antenna arrangements and channel assignments; however, the second embodiment may be different in that, for example, the second hardware embodiment has three radios, 288, 290, and 292 instead of one radio and RF switch 288 has additional ports to connect to additional radios. Although the second hardware embodiment shows three radios, there is no limit to the number of radios. Multiple radios may allow multiple antennas and physical sectors to be serviced simultaneously. Each radio may operate on the channel assigned to the antenna physical sector.

Figure 69:
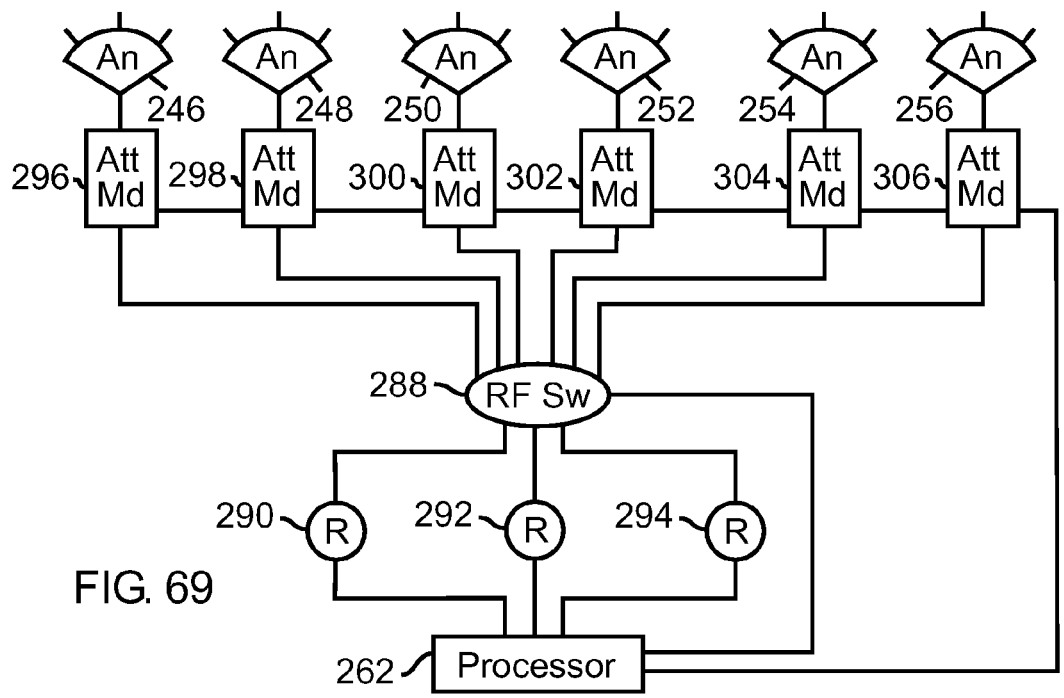
FIG. 69 is a diagram of an exemplary six antenna, six attenuation module, three radio, one RF switch wireless cell.

A third hardware embodiment, referring to FIG. 69, uses six antennas 246, 248, 250, 252, 254, and 256, six attenuation module embodiments 296, 298, 300, 302, 304, and 306, an RF switch 288, three radios 290, 292, and 294, and a processor 262. The antennas of the third hardware embodiment may be arranged to support a variety of channel assignment pattern and/or wireless cell coverage pattern including, for example, the exemplary channel patterns and wireless cell coverage shown in FIG. 39 or FIG. 42. Another embodiment may use polarized antennas to support the exemplary patterns and areas of FIG. 46, FIG. 49, and FIG. 53. In another embodiment, the number of antennas may be three to support exemplary wireless cell and channel assignment patterns of FIG. 31 or FIG. 32. In another embodiment, the number of antennas may be four to support the wireless cell and channel assignment patterns of FIG. 33 and FIG. 34. Attenuation module embodiments 296, 298, 300, 302, 304, and 306 may be implemented using, for example, the first, second, third, fourth, seventh, and eighth attenuation module embodiments. An exemplary third hardware embodiment may use the second attenuation module embodiment. The processor may control the RF switch and/or attenuation module.

Figure 70:
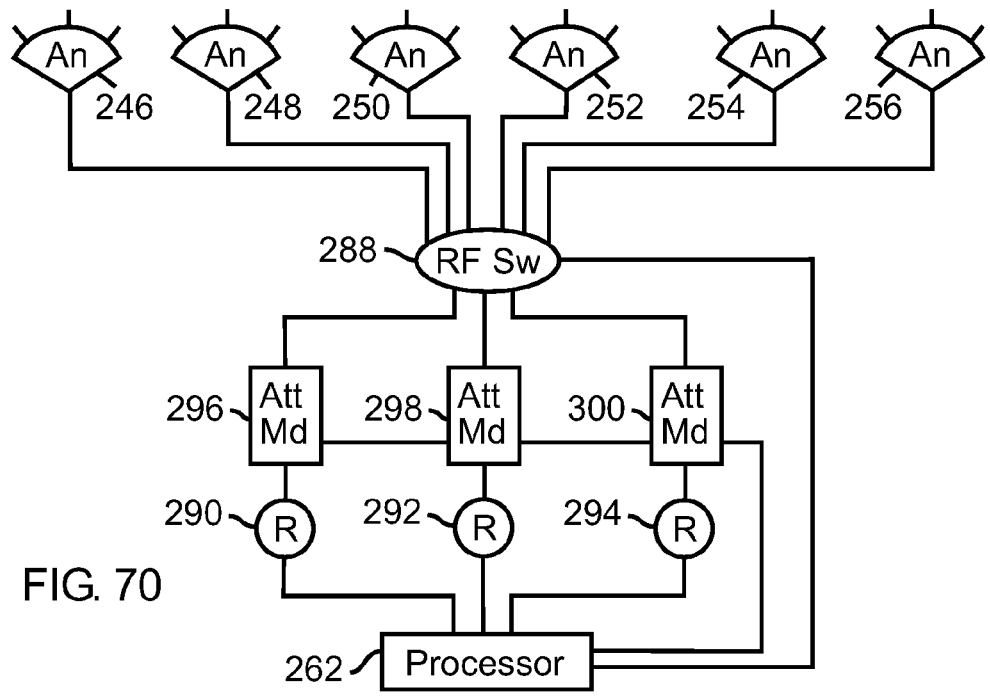
FIG. 70 is a diagram of an exemplary six antenna, three attenuation module, three radio, one RF switch wireless cell.

A fourth hardware embodiment, referring to FIG. 70, is similar to the third hardware embodiment in that the fourth embodiment has similar components, may support overlapping or non-overlapping coverage, and may have a variety of channel assignment patterns; however, the fourth hardware embodiment may be different in that, for example, the attenuation modules are positioned between the radios and the RF switch instead of between the RF switch and the antennas. The operation of the fourth hardware embodiment is similar to the operation of the third hardware embodiment. The attenuation modules 296, 298, and 300 of the fourth embodiment may be implemented using, for example, the first, second, third, fourth, fifth, sixth, seventh, and eighth attenuation module embodiments. An exemplary fourth hardware embodiment may use the fourth attenuation module embodiment. The processor may control the RF switch and/or attenuation module.

Figure 65:
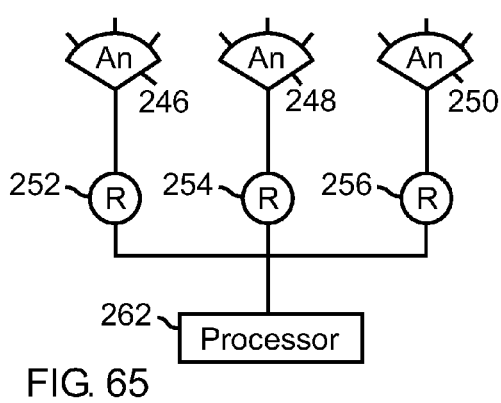
FIG. 65 is a diagram of an exemplary three antenna, three radio wireless cell.
Figure 66:
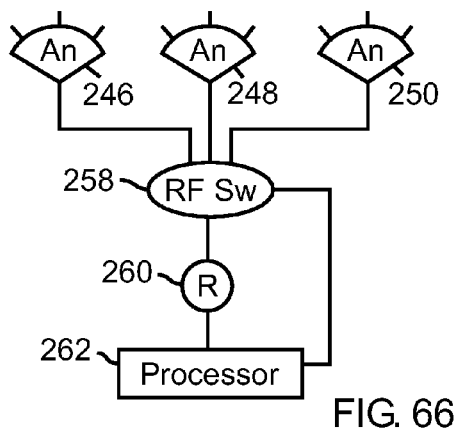
FIG. 66 is a diagram of an exemplary three antenna, one radio, one RF switch wireless cell.
Figure 71:
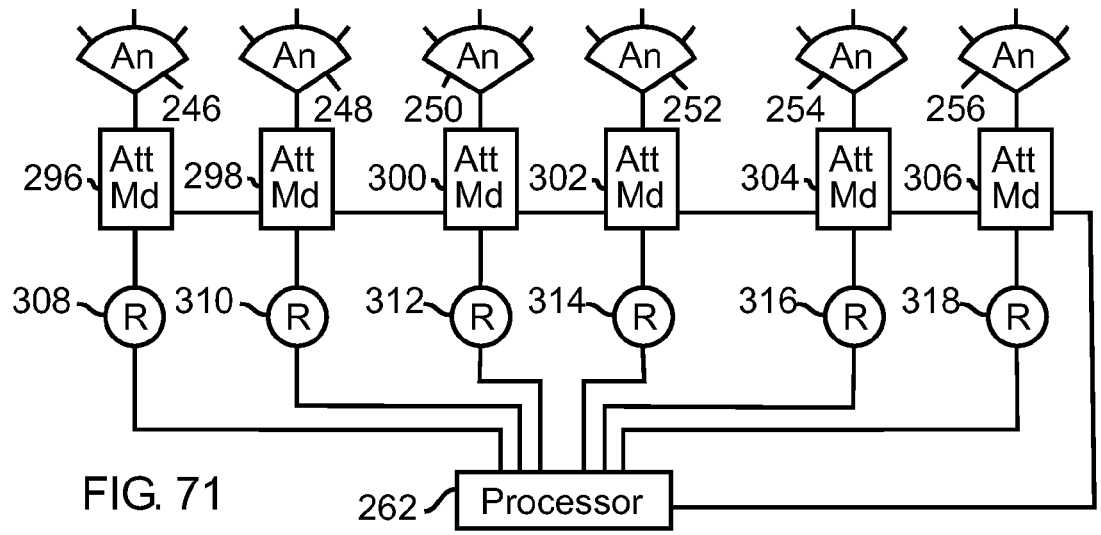
FIG. 71 is a diagram of an exemplary six antenna, six attenuation module, six radio wireless cell.

A fifth hardware embodiment, referring to FIG. 71, uses six antennas 246, 248, 250, 252, 254, and 256, six attenuation modules 296, 298, 300, 302, 304, and 306, six radios 308, 310, 312, 314, 316, and 318, and a processor 262. Each radio may be dedicated exclusively to a single antenna; therefore, a one-to-one correspondence may exist between radios, attenuation modules, and antennas. Like the third and fourth hardware embodiments, the fifth hardware embodiment, and variations of the fifth embodiment, may support the exemplary channel assignment patterns and wireless cell coverage areas shown in FIG. 31, FIG. 32, FIG. 33, FIG. 34, FIG. 39, FIG. 42, FIG. 46, FIG. 49 and FIG. 53. Another embodiment similar to the fifth embodiment may have four antennas, attenuation modules, and radios. Another embodiment may have three antennas, attenuation modules, and radios. The attenuation module embodiments 296, 298, 300, 302, 304, and 306 of the fifth embodiment may be implemented using, for example, the first, second, third, fourth, seventh, and eighth attenuation module embodiments. An exemplary fifth hardware embodiment may use the fourth attenuation module embodiment. The hardware embodiment shown in FIG. 65 is similar to the fifth hardware embodiment except it does not have attenuation.

Figure 72:
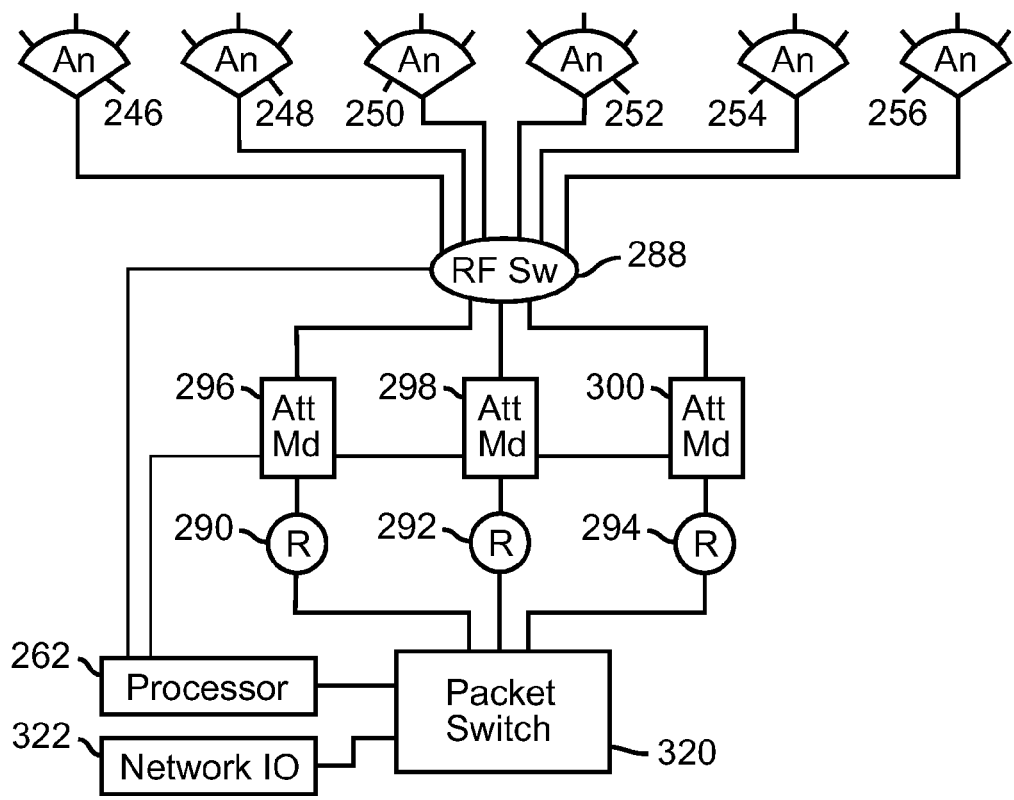
FIG. 72 is a diagram of an exemplary six antenna, three attenuation module, three radio, one packet switch, one RF switch wireless cell.

A sixth hardware embodiment, referring to FIG. 72, is similar to the fourth hardware embodiment; however, the sixth hardware embodiment may be different in that, for example, the sixth embodiment may include packet switch 320 and/or network IO connection 322. The packet switch may assist in routing packets between radios and/or the network IO connection. Many aspects of the sixth embodiment are similar to the fourth embodiment, for example, exemplary channel assignments patterns, antenna positioning, radio channel usage, and wireless cell coverage. The packet switch may control, for example, RF switch 288, the radios, and the attenuation modules. Another embodiment is similar to the sixth embodiment; however, it may differ from the sixth embodiment in that, for example, it does not have attenuation modules and the antennas may be positioned to provide overlapping coverage. The use of a packet switch is not limited to the sixth embodiment. All hardware embodiments may have a packet switch in addition to a processor. Additionally, all hardware embodiments may have a network IO connection.

Figure 73:
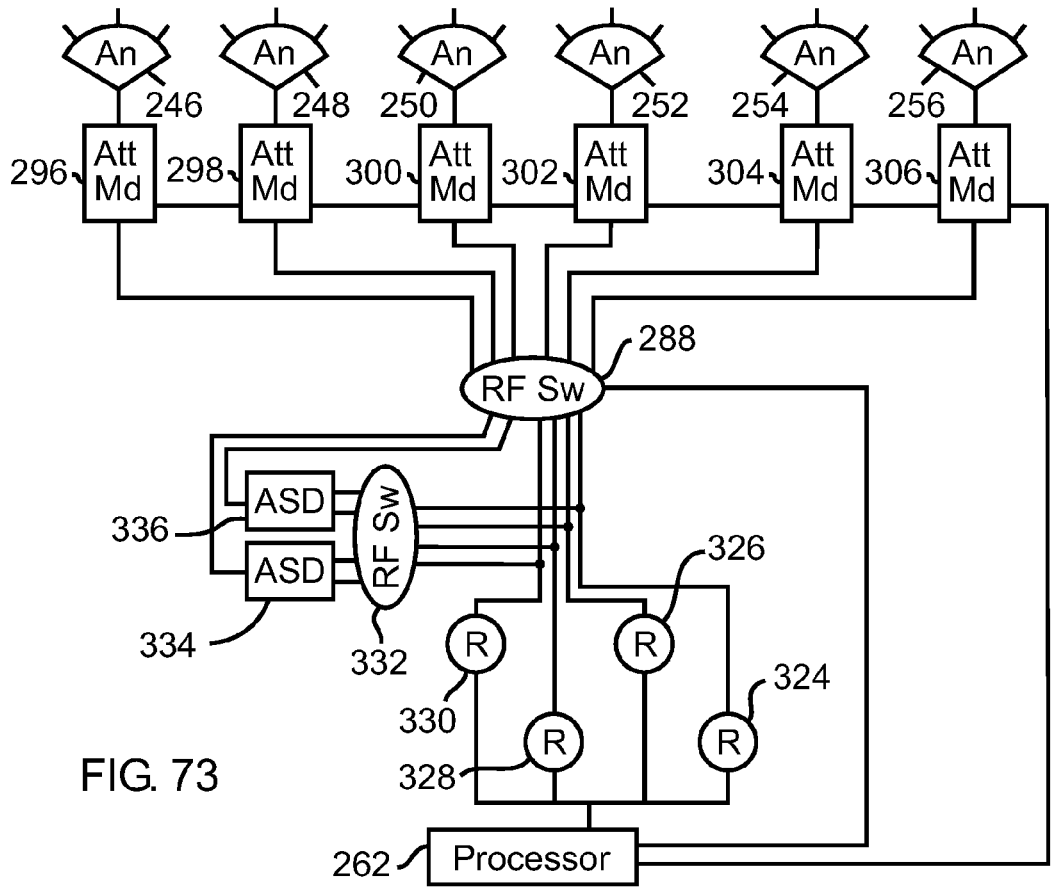
FIG. 73 is a diagram of an exemplary six antenna, six attenuation module, four radio, one packet switch, and two RF switch wireless cell.

A seventh embodiment, referring to FIG. 73, includes six antennas 246, 248, 250, 252, 254, and 256, six attenuation modules 296, 298, 300, 302, 304, and 306, two RF switches 288 and 332, four radios 324, 326, 328, and 330, two ASDs 334 and 336, and a processor 262. Excluding the operation of RF switch 332 and ASDs 334 and 336, the seventh hardware embodiment is similar to the third hardware embodiment. Inclusion of RF switch 332 and ASDs 334 and 336 may allow at least two radios to service the same antenna, which operation may for example, increase redundancy of radios, reliability, and performance. Another embodiment is similar to the seventh embodiment; however, it may differ from the seventh embodiment in that, for example, it does not have attenuation modules and the antennas may be positioned to provide overlapping coverage. Another embodiment is similar to the seventh embodiment; however, it may differ in that, for example, the attenuation modules may be placed between the radios and RF switches 288 and 332 instead of between RF switch 288 and the antennas.

Figure 74:
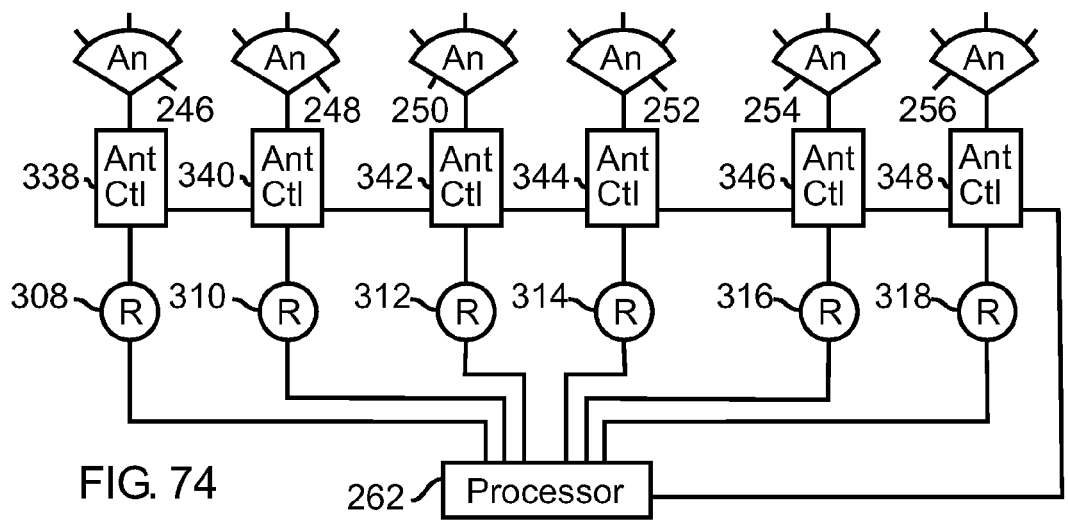
FIG. 74 is a diagram of an exemplary six antenna, six attenuation module, six radio wireless cell.

An eighth hardware embodiment, referring to FIG. 74, includes six antennas 246, 248, 250, 252, 254, and 256, six antenna control devices 338, 340, 342, 344, 346, and 348, six radios 308, 310, 312, 314, 316, and 318, and a processor 262. The eighth hardware embodiment is similar to the fifth hardware embodiment in that each radio may exclusively service a single antenna and the antennas may be positioned to provide a variety of channel patterns, physical sector coverage patterns, and wireless coverage; however, the eighth hardware embodiment may be different in that, for example, the eighth hardware embodiment may use antenna control devices. Antenna control devices may perform a variety of functions, for example, physically move the antenna, electronically change the coverage of the antenna, control multiple antennas to function in a coordinate manner, perform summation on signals, match impedance, perform active antenna tuning, and use signal process techniques on the incoming and/or outgoing signals to increase antenna performance. The antenna control device may control at least one of directional antenna, dipole antenna, omni-directional antenna with reflector, omni-directional positioned in a horn, patch fixed antenna array, adaptive antenna array, MIMO antennas, yagi, dish, beam, and parabolic antennas. In another embodiment, attenuation modules may be added between each antenna and each antenna control device. In another embodiment, attenuation modules may be added between the antenna control devices and the radios. In other embodiments similar to at least one of the first, second, fourth, and sixth hardware embodiment antenna control devices may be added between each antenna and the RF switch.

Figure 75:
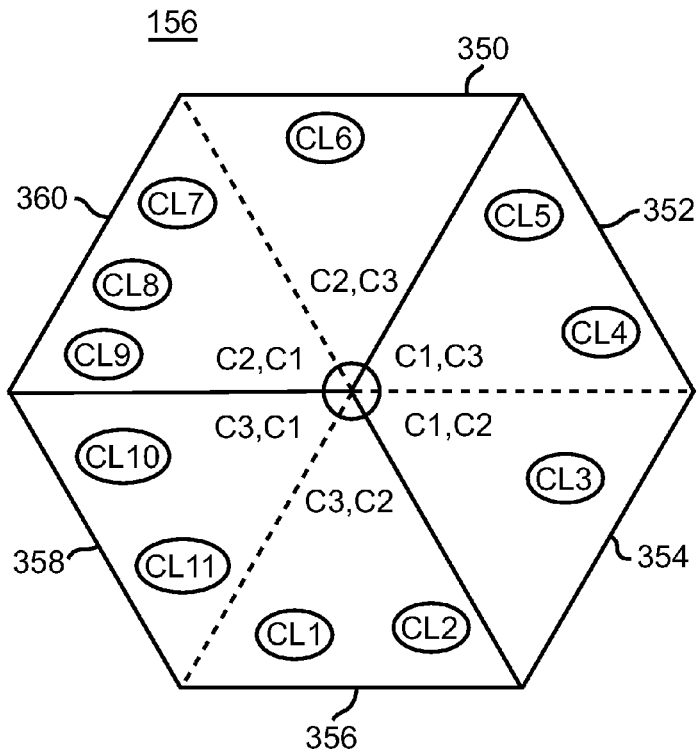
FIG. 75 is a diagram of an exemplary method for servicing clients with an overlapping wireless cell.

Now turning to an example of how a hardware embodiment may service clients. This example may in some ways be explicit and describe a single method without consideration of other possible methods; however, this example is not limiting because it describes a limited subset of the possible methods in which a wireless cell may service clients. The methods of servicing clients and/or the operation of a wireless cell are not limited to the exemplary method herein described. The example, assumes that the second hardware embodiment, as shown in FIG. 68, is arranged to provide the channel pattern and wireless cell coverage of wireless cell 156 as shown in FIG. 39. Although the antennas of the third hardware embodiment may be arranged in a variety of ways to provide the channel pattern of FIG. 39, this example assumes that antenna 246, 248, 250, 252, 254, and 256 may be positioned to correspond to physical sectors 264, 266, 268, 270, 272, and 274 as shown in FIG. 37 and FIG. 38 respectively. Referring now to FIG. 75, clients CL1 and CL2 may be located in virtual sector 356, client CL3 may be located in virtual sector 354, clients CL4 and CL5 may be located in virtual sector 352, client CL6 may be located in virtual sector virtual sector 350, clients CL7, CL8, and CL9 may be located within virtual sector 360, and clients CL10 and CL11 may be located in virtual sector 358.

The steps and methods of wireless cell operation may vary with, for example, hardware configuration, channel assignments, environmental factors, and clients detected. For this example, some time after initialization, the clients located in the wireless cell's coverage area, try to associate with wireless cell 156. The association process may be performed, for example, by polling for clients in each virtual sector. Polling for clients in virtual sector 356 may be done, for example, by connecting one of the radios 290, 292, or 294, to antenna 246 and/or to antenna 256 and polling for clients to determine which antenna and channel may provide improved performance. An exemplary method polls each client through each antenna that services the virtual sector. Each client may then request to associate with one of the antennas used during the polling. The wireless cell may decide which antenna should service each client; therefore, if a client desires with a specific antenna, the wireless cell can deny the association. The wireless cell may accept client association when the client requests to associate with the antenna selected by the wireless cell to service that client. For this example, assume that clients CL1 and CL11 associate with antenna 246, CL2 and CL3 with antenna 256, CL4 with antenna 250, CL5 and CL6 with antenna 254, CL7 with antenna 248, and CL8, CL9 and CL10 with antenna 252. In this example, the client-antenna associations specified signify that clients CL1, CL5, CL6, and CL11 use channel C3, clients CL2, CL3, and CL7 use channel C2, and clients CL4, CL8, CL9, and CL10 use channel C1.

The wireless cell may periodically assign an available radio to poll virtual sectors to detect, for example, client transmission requests, client reception requests, and client association requests. Radios may be assigned to service and/or poll virtual sectors based on, for example, client demand, timeliness of delivery, timeliness of reception, a relationship between clients where one client delivers data to another client, desired throughput, or time multiplexing. While radios may be occupied servicing client requests, the remaining radios may poll virtual sectors for client requests. If all radios are busy servicing client requests, no radio may be available to poll for new client requests; however, polling may resume when at least one radio becomes available. For the purpose of providing more specific detail on how a wireless cell may service clients, assume that client CL10 desires to send data to client CL3, client CL2 desires to send data to client CL7, and client CL5 desires to send data to CL4. The sequence of events described here for servicing client requests is only an example. Many different methods, orders, techniques, and/or variations may exist for servicing clients.

In this example, radio 290 may be set to channel C1 and attached to antenna 252. Radio 290 detects the request form CL10 to send data to CL3. Meanwhile, radio 292 may be set to C2 and attached to antenna 256. Radio 292 detects the request from CL2 to send data to CL7. Meanwhile, radio 294 may be set to channel C3 and attached to antenna 254. At this time, no radio may be available to poll the virtual sectors for other client requests. Now turning to servicing client CL10, CL10 desires to send data to CL3, but no antenna is available to service CL3 because antenna 256 may be busy with CL2. Furthermore, a radio may not be available, so CL10 may not send data directly to CL3; therefore, processor 262 accepts the data sent from CL10 and may store it for later forwarding to client CL3. Meanwhile, CL2 may not directly send data to CL7 because a radio may not be available; therefore, the processor may store the data from CL2 to be forwarded later to CL7. Meanwhile, CL5 may not directly send to CL4 because a radio may not be available, so the process may store the data from CL5 to be forwarded later to CL4. Assume the transfer from CL10 is relatively short and that radio 290 may become available before the other radios become available. When radio 290 becomes available, it may be used to, for example, poll for other client requests, service other known client requests, and transfers data stored for forwarding. In this example, assume that after polling, radio 290 finds no additional client requests. Radio 290 may be assigned to either forward data to CL3, CL4, or CL7; however, CL3 can only be accessed through antenna 256, which is still in use with CL2. Assume that radio 290 changes its channel to C1 and is assigned to antenna 250 to transfer stored data to CL4. Radio 294 now receives data from CL5 through antenna 254 while radio 290 transfers data to CL4 through antenna 255. Assume that after some time, CL2 finishes its transfer thereby freeing up radio 292. Radio 292 may now scan for new requests or it may transfer stored data. Assume there are no new requests. Stored data is available to send to CL3 and CL7, and because antenna 256 is no longer servicing CL2, it is available to service CL3; therefore, radio 292 may be assigned to send stored data to CL3 or to CL7. Assume that radio 292 is set to channel C2, reassigned to antenna 256, and used to send stored data to CL3. When a radio becomes available, data stored for CL7 may be sent. As radios may become available, they may poll virtual sectors for additional client requests.

Now turning to exemplary methods and apparatus used to form wireless networks using wireless cells. Generally, networks may be formed by placing wireless cells in such a manner that they may wirelessly communicate with each other. Another method of forming a network may be to place wireless cells and provide a wired interface between the wireless cells. Another method may be to place wireless cells such that some wireless cells may communicate wirelessly and some wireless cells may communicate by some other interface, for example, wired interface, infrared interface, optical interface, and acoustic interface. Various network formation methods are presented in this application. The network formation methods and resulting network embodiments are exemplary and not limiting. A variety of factors may be controlled when forming networks, for example, physical sector placement (overlapping and non-overlapping), area of coverage, angle of coverage, shape of coverage, channel assignment patterns, wireless cell orientation, and sector or virtual sector disablement. A network may consist of any number of wireless cells including a single wireless cell.

Figure 76:
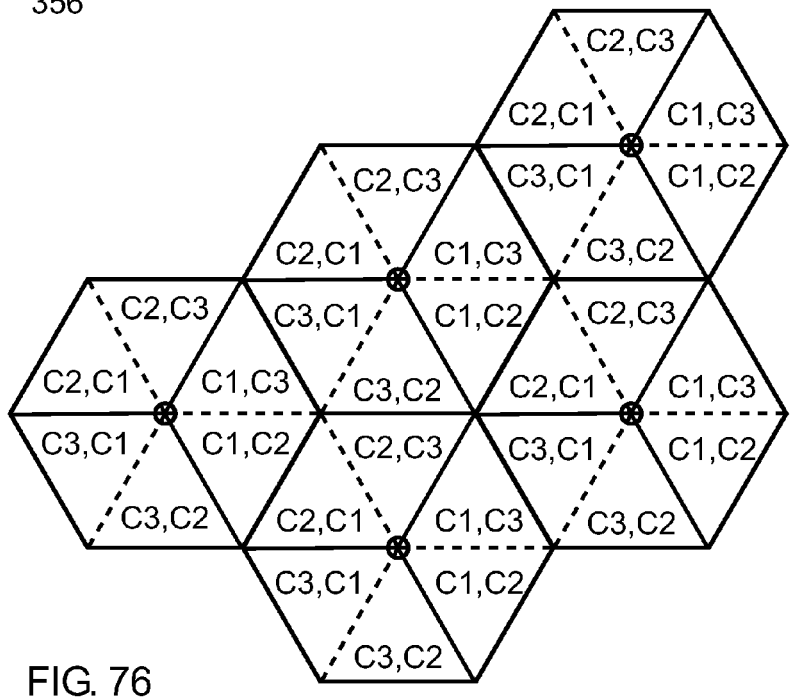
FIG. 76 is a diagram of an exemplary wireless network formed by replicating wireless cells each with shape of coverage similar to a hexagon resulting in a network channel assignment pattern where opposing virtual sectors have similar channels.

A first network formation method may consist of placing wireless cells of similar channel assignment, similar orientation, and whose coverage shape may be similar to a hexagon into substantially adjacent positions. The network embodiment shown in FIG. 35 may be formed using the first network formation method. The first network formation method may use the wireless cell shown in FIG. 31 to form the network embodiment of FIG. 35. The network embodiment of FIG. 35 may be more suited to enable each wireless cell to service their associated clients than to communicate wirelessly with adjacent cells because opposing sectors use different, possibly minimally interfering, channels. The first network formation method may also be used to form the network shown in FIG. 76 by replicating the wireless cell shown in FIG. 39. The network embodiment of FIG. 76 may be more suited to inter-cell communication than to servicing associated clients because all channels of opposing virtual sectors are the same or similar. The network embodiment of FIG. 50 may be formed using the first network formation method by replicating the wireless cell shown in FIG. 49. Another network embodiment, shown in FIG. 57, may be formed using the first network formation method by replicating the wireless cell of FIG. 55.

The first network formation method may work with cells of any size. In another network embodiment, shown in FIG. 77, wireless cells of different sizes may be placed to form a network. The wireless cells may differ in size by a factor of about one-half raised to an integer power. Because the first network formation method may use wireless cells with similar channel assignments and similar orientation regardless of size, the network characteristics may be retain when cells of different sizes are used. For example, opposing sectors of exemplary network in FIG. 77 use different, possibly minimally interfering, channels, which may make the network more suited to service clients than to communicate between adjacent wireless cells. Replacing wireless cells 362, 354, and 366 with a wireless cell similar to wireless cell 368 may not alter that network characteristic because opposing sector still use different channels. The network embodiment of FIG. 77 may be more suited to servicing clients regardless of the wireless cell size used because opposing sectors may use different, possibly minimally interfering, channels.

A second network formation method may consist of forming what may be referred to as a cluster then placing clusters of similar orientation into substantially adjacent positions. Wireless cells that may have different characteristics, such as, for example, physical sector placement (overlapping and non-overlapping), area of coverage, angle of coverage, shape of coverage, channel assignments, wireless cell orientation, and sector or virtual sector disablement may form clusters. Cluster embodiments that may have different characteristics may also be used to form a network embodiment. Various cluster embodiments that may use wireless cells that may have a shape of coverage similar to a hexagon are shown in FIG. 78 through FIG. 82. Cluster embodiments are not limited to wireless cell shapes that may be similar to a hexagon. Clusters are also not limited to groupings of three wireless cells. In the cluster embodiment of FIG. 78, opposing physical sectors of wireless cells 370, 372, and 374 may have the same or similar channels, which may facilitate inter-cell communication. Replication and substantially adjacent placement of the cluster embodiment of FIG. 78 results in a network that may be more suited for inter-cell communication because opposing physical sectors of the resulting network embodiment may have the same or similar channels. In general, the communication characteristics of the cluster may extend to the network formed from the cluster. In one cluster embodiment, the channels in opposing physical sectors are the same.

In the cluster embodiment of FIG. 79, opposing virtual sectors of wireless cells 376, 378, and 380 may use different, possibly minimally interfering, channels, which may enable each virtual sector to communicate with its associated clients with less interference from/to opposing virtual sectors. Replication and substantially adjacent placement of the cluster embodiment of FIG. 79 results in a network that may be more suited for client communication because opposing virtual sectors of the resulting network embodiment may have different, possibly minimally interfering, channels. For this cluster embodiment, the communication characteristics of the cluster, being potentially improved client communication, may become the communication characteristic of the network embodiment formed by replicating and placing the cluster embodiment. The cluster embodiment of FIG. 80 is similar to the cluster embodiment of FIG. 79 in that, for example, opposing virtual sectors of wireless cells 382, 384, and 386 may use different, possibly minimally interfering, channels; however, cluster embodiment of FIG. 80 may use more channels than the cluster embodiment of FIG. 79. In another cluster embodiment, the channels used in opposing virtual sectors are minimally interfering.

Figure 81:
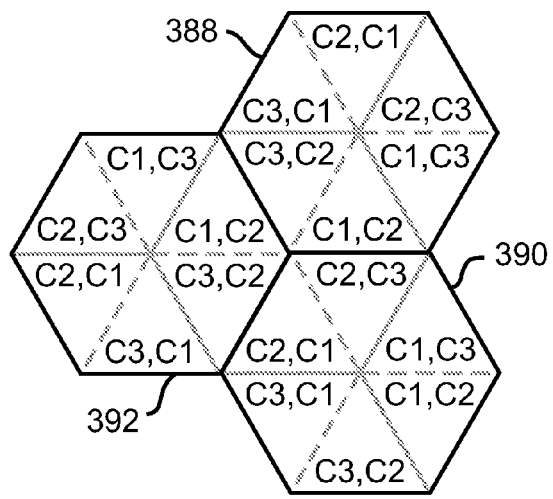
FIG. 81 is a diagram of an exemplary wireless cell cluster formed using three channels and three wireless cells each with shape of coverage similar to a hexagon resulting in a cluster channel assignment pattern where opposing virtual sectors have one similar and one different channel.
Figure 82:
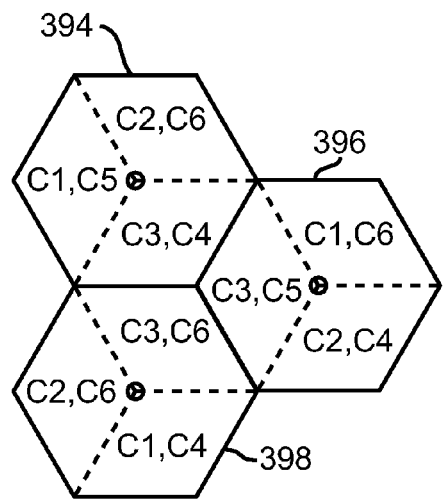
FIG. 82 is a diagram of an exemplary wireless cell cluster formed using six channels and three wireless cells each with shape of coverage similar to a hexagon resulting in a cluster channel assignment pattern where all opposing virtual sectors have one common channel.
Figure 83:
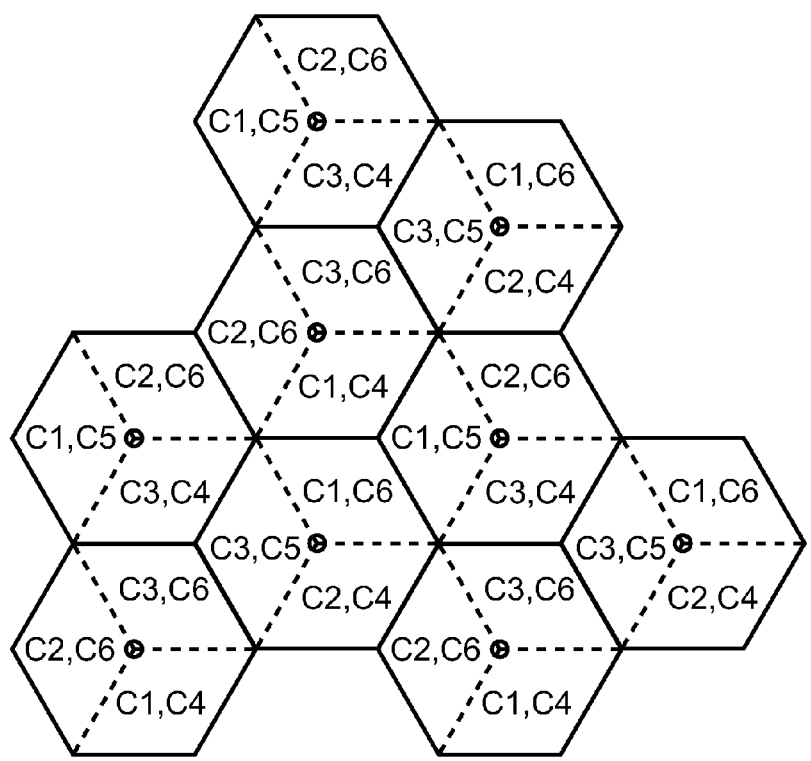
FIG. 83 is a diagram of an exemplary wireless network formed by replicating the cluster of FIG. 82.
Figure 84:
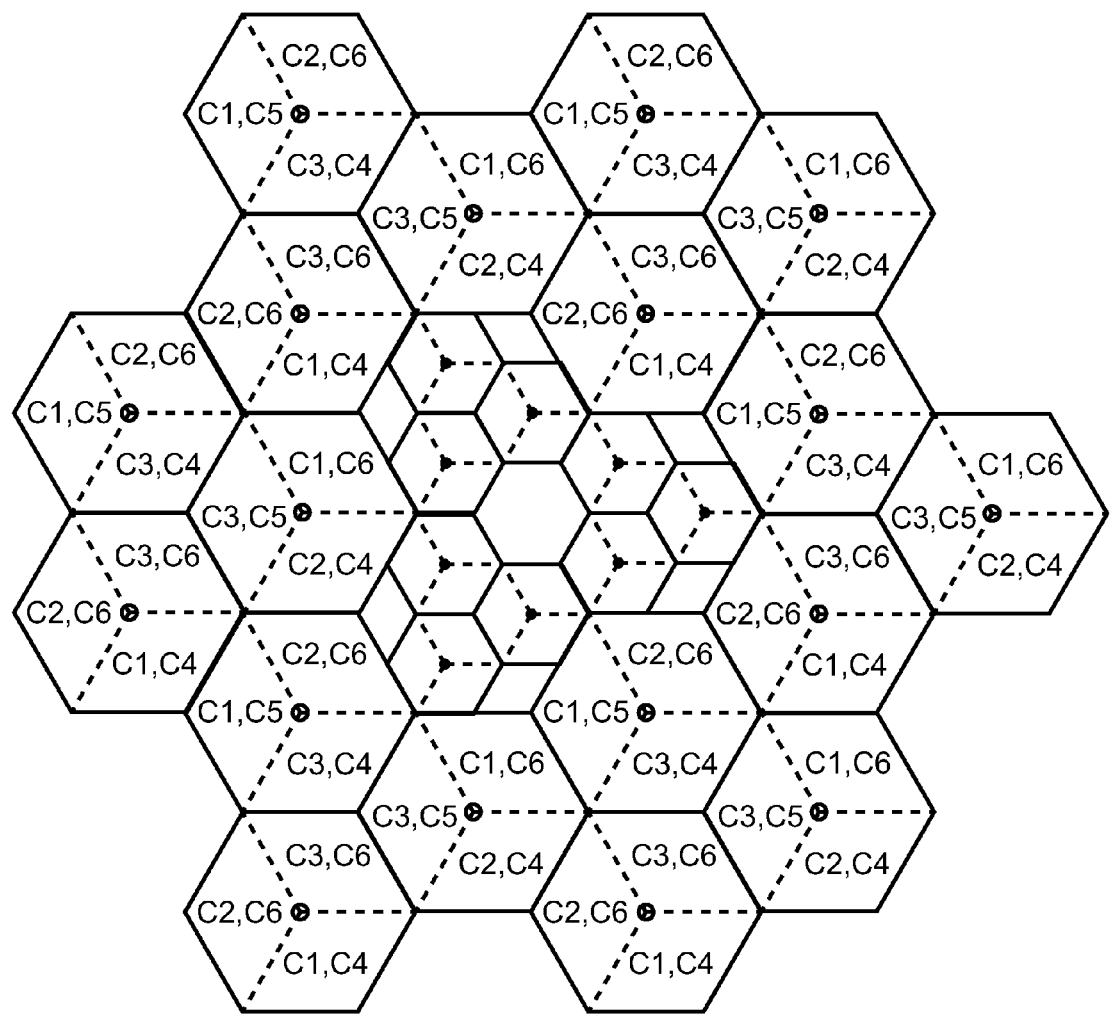
FIG. 84 is a diagram of an exemplary wireless network formed by replicating various sizes of the cluster of FIG. 82.
Figure 85:
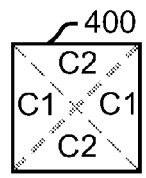
FIG. 85 is a diagram of an exemplary channel assignment pattern for a wireless cell with shape of coverage similar to a square.
Figure 86:
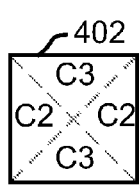
FIG. 86 is a diagram of an exemplary channel assignment pattern for a wireless cell with shape of coverage similar to a square.
Figure 87:
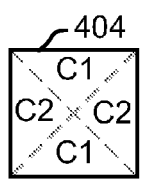
FIG. 87 is a diagram of an exemplary channel assignment pattern for a wireless cell with shape of coverage similar to a square.
Figure 88:
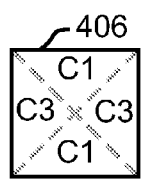
FIG. 88 is a diagram of an exemplary channel assignment pattern for a wireless cell with shape of coverage similar to a square.
Figure 89:
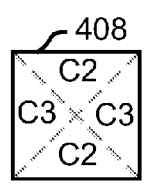
FIG. 89 is a diagram of an exemplary channel assignment pattern for a wireless cell with shape of coverage similar to a square.
Figure 90:
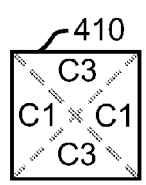
FIG. 90 is a diagram of an exemplary channel assignment pattern for a wireless cell with shape of coverage similar to a square.

In the exemplary cluster embodiment of FIG. 81, opposing virtual sectors of wireless cells 388, 390, and 392 may have a number of channels that may be the same or similar, and a number of channels that may be different and minimally interfering. Communication between adjacent wireless cells using channels assigned to the virtual sectors that may be the same or similar may facilitate inter-cell communication. Communication using the channels of the virtual sectors that may be different and possibly minimally interfering may enable each virtual sector to service its associated clients with reduced interference to/from opposing virtual sectors. Replication and substantially adjacent placement of the cluster embodiment of FIG. 81 may result in a network embodiment that may perform inter-cell communication and service clients with reduced interference simultaneously because opposing virtual sectors may have a number of channels that may be the same or similar and a number of channels that may be different and possibly minimally interfering. The cluster embodiment of FIG. 82 is similar to the cluster embodiment of FIG. 81 in that, for example, opposing virtual sectors of wireless cells 394, 396, 398 may have a number of channels that may be the same and a number of channels that may be different; however, cluster embodiment of FIG. 82 may use more channels than the cluster embodiment of FIG. 81. The network embodiment shown in FIG. 83 may result from replicating, with similar orientation, the cluster embodiment of FIG. 82, three times and placing the cluster embodiments substantially adjacent. Replicating, with similar orientation, and placing the cluster embodiment of FIG. 82 in various sizes may form the network embodiment of FIG. 84. In the network embodiment of FIG. 84, the wireless cells and the clusters may differ by a factor of about one-half raised to an integer power. Smaller clusters may be used to replace larger clusters. Exemplary smaller cluster have similar orientation and channel assignments to the larger clusters. Cluster embodiments with different characteristics such as, for example, channel assignments, orientation, and size, may be used together to form network embodiments. There are no limitations on placement or use of cluster embodiments to form networks. Additionally, a single cluster embodiment may be considered a network.

A third network formation method may consist of placing wireless cells whose coverage shape may be similar to a square, as shown in FIG. 11, into substantially adjacent positions and selecting a desirable channel assignment pattern for each cell. In one network embodiment, three minimally interfering channels may be assigned to physical sectors of each wireless cell in a manner that may reduce interference between adjacent physical sectors. Six different embodiments of channel assignment patterns that may use three minimally interfering channels are shown in FIG. 85 through FIG. 90. Networks formed using the third network formation method may have various characteristics. In one embodiment, four minimally interfering channels may be assigned to the wireless cell physical sectors. In another network embodiment, eight minimally interfering channels may be assigned to the wireless cell physical sectors. In another embodiment, opposing physical sectors may have different, possibly minimally interfering channels, which may enable a physical sector to communicate with its clients with less interference from/to an opposing physical sector. In another embodiment, wireless cells of a substantially square shape of coverage may have physical sectors that may substantially overlap by about 100%; thereby, forming virtual sectors capable of being serviced by more than one channel. In another embodiment, opposing virtual sectors may have at least one channel that may be the same or similar, which may enhance the ability of wireless cells to communicate. In another embodiment, opposing virtual sectors may have at least one channel that may be the same or similar and at least one channel that may be different and possibly minimally interfering, which may enabled a wireless cell to simultaneously service clients with less interference and to perform inter-cell communication. Other embodiments are possible that may have other combinations of channels in opposing sectors.

Figure 91:
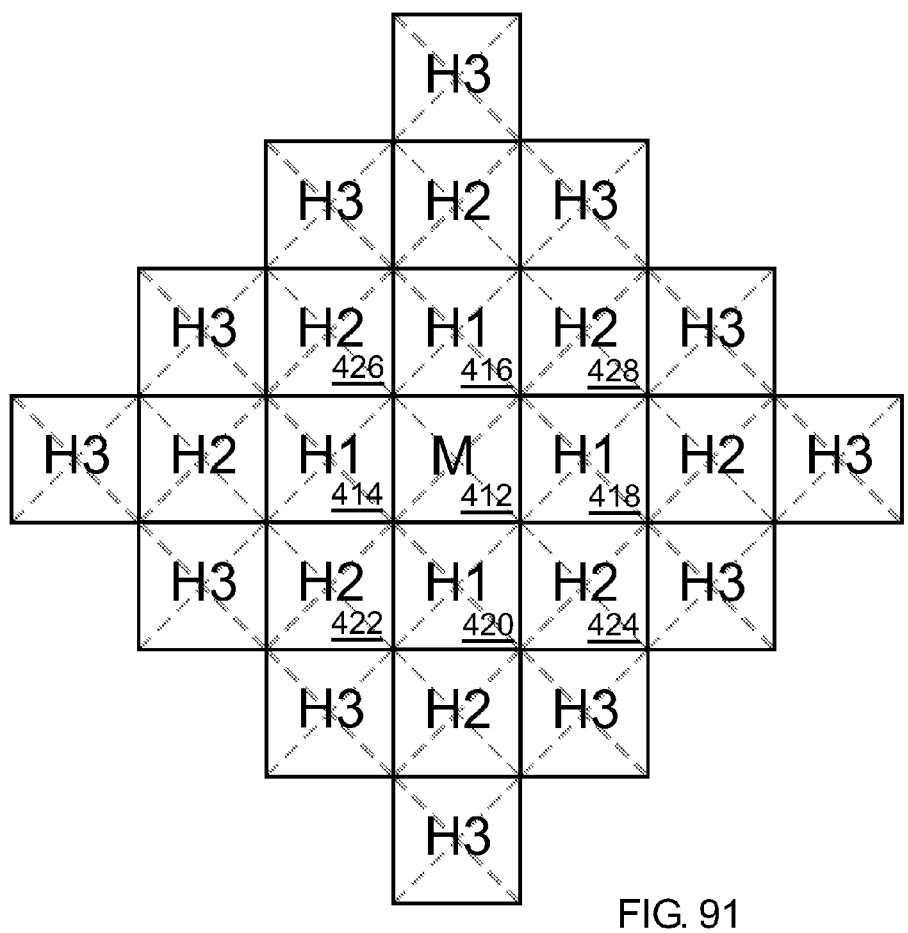
FIG. 91 is a diagram of an exemplary wireless network formed using wireless cells with shape of coverage similar to a square and indicating hop level numbers.

A first step of the third network formation method may be to place wireless cell of substantially square shape such that, for example, their areas of coverage are substantially adjacent as shown in FIG. 91. A next step may be to identify what may be referred to as a master cell. The master cell may be any cell in the network. The master cell may be selected by a variety of methods, for example, manually by the person establishing the network, by election performed by the wireless cells at initialization, and by virtue of being the first wireless cell powered on when setting up the network. Wireless cell 412 in exemplary network embodiment of FIG. 91 may be designated the master cell. The next step may be to assign a status, referred to as a hop number, to each wireless cell in the network excluding the master. Ideally, the hop number may be a measure of a wireless cell's distance from the master. In an exemplary network, the master may determine the distance between itself and other wireless cells using a variety of methods such as, for example, signal strength, time-of-fight, global positioning system (GPS) coordinate, and pre-programmed table look-up. In one embodiment, the master cell may scan for other wireless cells in each of its sectors and may measure the signal strength of each wireless cell detected. The cells with the strongest signal strengths may be assigned a status referred to as one-hop; which means that those wireless cells may be one hop away from the master. Ideally, only the four wireless cells physically closest to the master may be labeled one-hop. Wireless cells 414, 416, 418, and 420 in exemplary network embodiment of FIG. 91 may be designated one-hop wireless cells. Each wireless cell hop level may in turn identify the next hop level. For example, one-hop wireless cells may search for and identify all closest wireless cells, excluding any wireless cell that may already be assigned a hop number, as two-hop cells. Two-hop wireless cells may in turn identify three-hop cells, and so forth. In exemplary network embodiment of FIG. 91, two-hop wireless cells are labeled "H2" and three-hop wireless cells "H3"

A next step of the third network formation method may be to assign a channel assignment pattern. An exemplary network embodiment may assign channel patterns so that no opposing sectors may use the same or similar channel. In one embodiment, such a pattern may be achieved by assigning the master wireless cell 412 the channel pattern of wireless cell 400 of FIG. 85. The one-hop wireless cells above and below, 416 and 420, the master wireless cell may be assigned the channel pattern of wireless cell 402 of FIG. 86. The one-hop wireless cells to the left and to the right, 414 and 418, of the master wireless cell may be assigned the channel pattern of wireless cell 404 of FIG. 87. The two-hop wireless cells contiguous to two one-hop wireless cells, wireless cells 422, 424, 426 and 428, may be assigned the channel pattern of wireless cell 410 of FIG. 90. Wireless cells 412 through 428 inclusive may form a core pattern that may be replicated by placing the center cell of the core pattern (i.e., the master cell) over any even-hop cell and assigning the channel patterns of the core cell to any unassigned wireless cells. Other variations of channel pattern assignments may be possible.

A fourth network formation method is similar to the third network formation method in that wireless cells may be placed in substantially adjacent positions, master and hop placement identification technique may be used, and channel assignment patterns may be selected to provide network communication characteristics suited for at least one of client communication, inter-cell communication, and both client and inter-cell communication. However, the fourth network formation method may be different in that, for example, the wireless cell shape of coverage may be similar to a triangle as shown in FIG. 7.

One network embodiment formed using the fourth network formation method, may use three minimally interfering channels assigned to physical sectors of each wireless cell in a manner that may reduce interference between adjacent physical sectors. Six different embodiments of channel assignment patterns for a substantially triangular shaped wireless cell that use three minimally interfering channels are shown in FIG. 92 through FIG. 97. Networks formed using the fourth network formation method may have various characteristics. In one embodiment, six minimally interfering channels may be assigned to wireless cell physical sectors. In another embodiment, nine minimally interfering channels may be assigned to wireless cell physical sectors.

In another embodiment, opposing cells may have at least one channel that may be the same or similar, which may enhance inter-cell communication. In another embodiment, substantially triangular wireless cells shapes may have physical sectors that may substantially overlap by about 100%; thereby, forming virtual sectors capable of being serviced by more than one channel. In another embodiment, opposing virtual sectors may have different, possibly minimally interfering channels, which may enable a wireless cell to communicate with its clients with less interference from/to the opposing sectors. In another embodiment, opposing virtual sectors may have at least one channel that may be the same or similar and at least one channel that may be different, possibly minimally interfering, which may enabled a wireless cell to simultaneously service clients with less interference and to perform inter-cell communication. Other embodiments are possible that may have other combinations of channels in opposing physical or virtual sectors.

Figure 99:
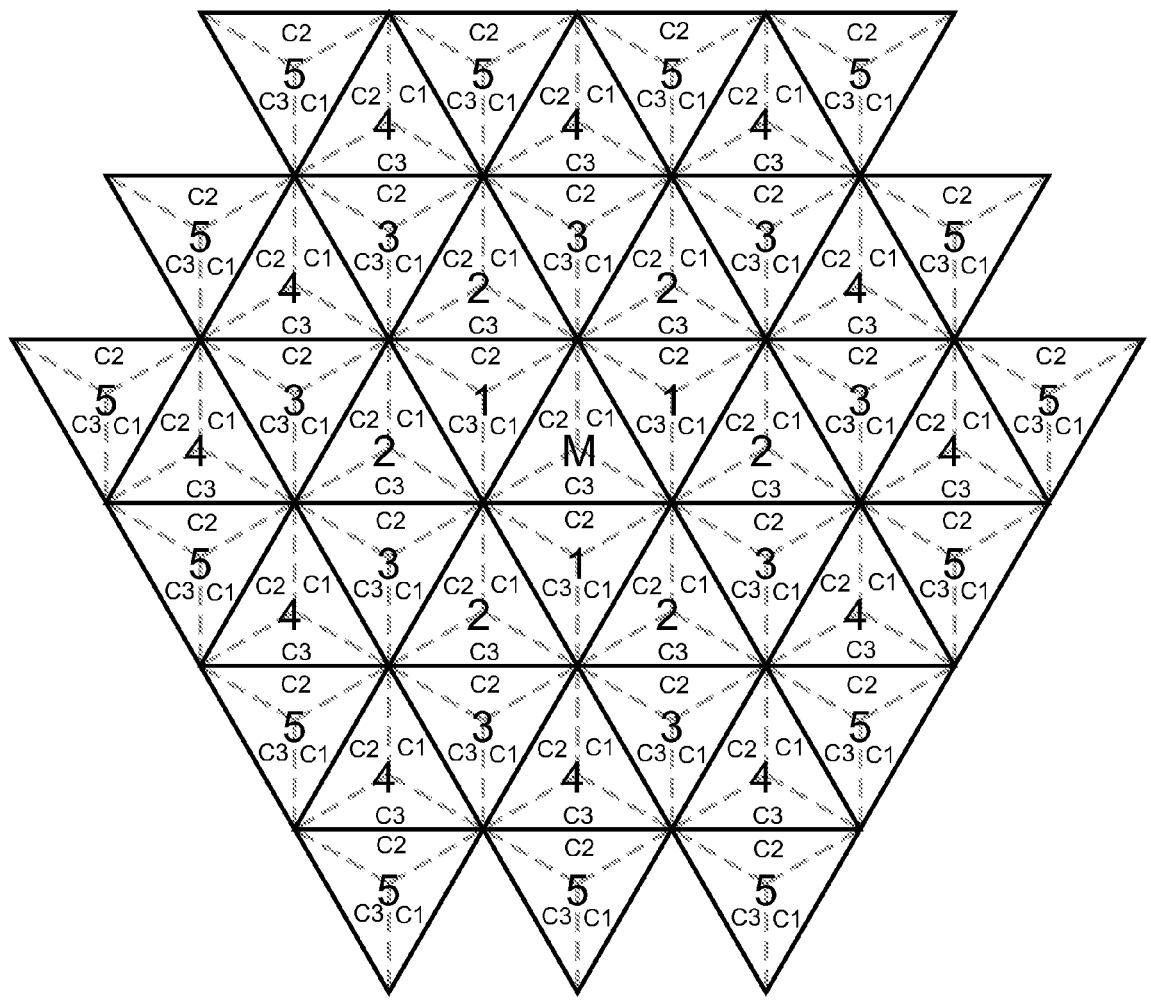
FIG. 99 is a diagram of an exemplary wireless network formed using wireless cells with shape of coverage similar to a triangle and indicating hop level numbers and exemplary channel pattern assignment.
Figure 100:
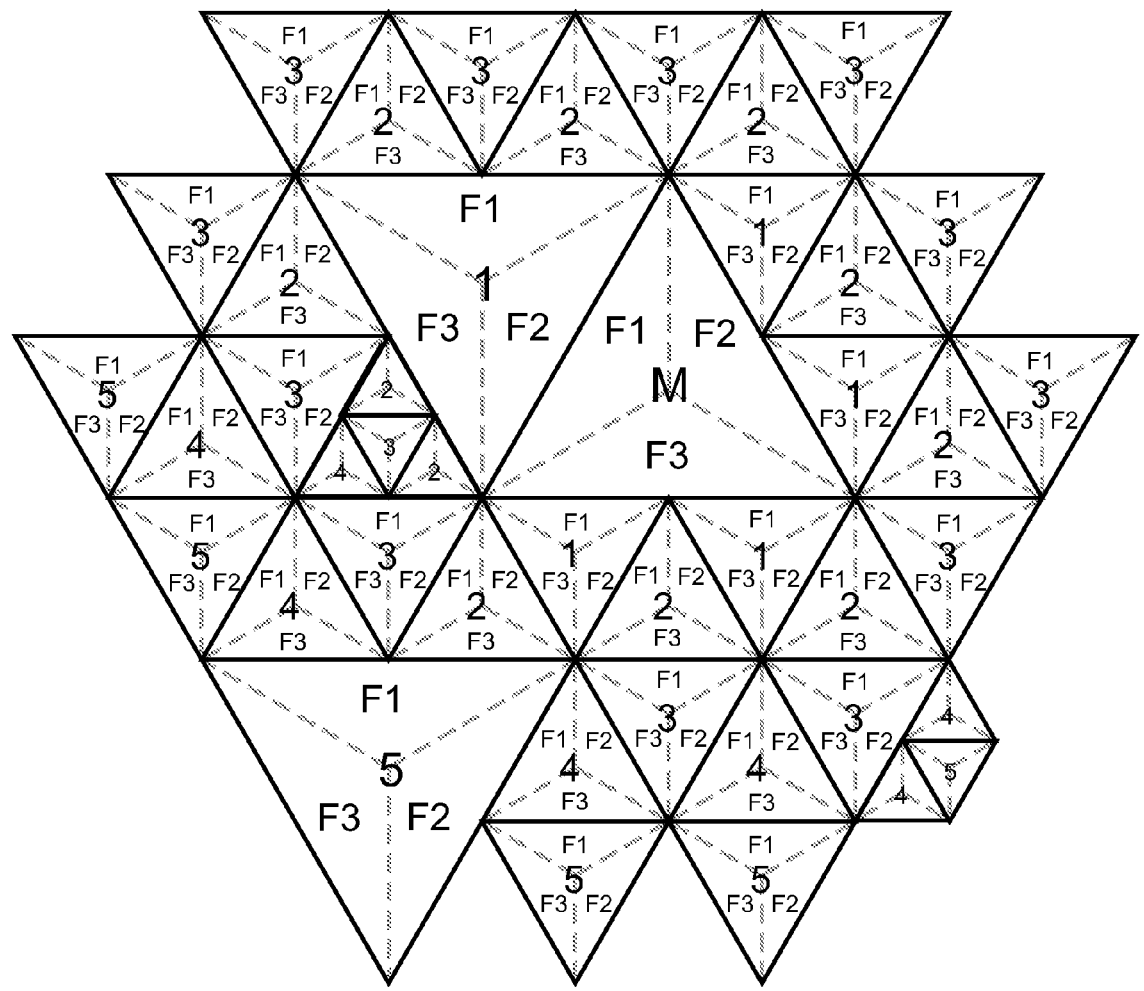
FIG. 100 is a diagram of an exemplary wireless network formed using wireless cells of various sizes with shape of coverage similar to a triangle and indicating hop level numbers and exemplary channel pattern assignment.

A first step of the fourth network formation method may be to place wireless cells such that, for example, their areas of coverage are substantially adjacent as shown in FIG. 98. A next step may be to identify what may be referred to as a master cell. Identification of the master cell may be performed using techniques similar to the techniques described in the third network formation method. Wireless cell 430 in FIG. 98 may be identified as a master cell. The next step may be to assign a status, referred to as a hop number, to each wireless cell in the network excluding the master. The techniques disclosed in the third network formation method for identifying and assigning hop numbers may be used in the fourth network formation method. In the exemplary network of FIG. 98, each wireless cell is identified with a hop number: "H1" for one-hop, "H2" for two-hop, and so forth. A next step may be to assign a channel assignment pattern. An exemplary network embodiment may assign channel patterns so that no opposing sectors may use the same or similar channel. One method for assigning channels to an exemplary network embodiment may be to first select a channel assignment pattern from the channel assignments patterns shown in FIG. 92 through FIG. 97. The selected pattern may be assigned to the master cell and all even hop numbered cells. The selected pattern may also be assigned to all odd hop numbered cells; however the pattern must first be rotated about 60 degrees. The rotation may be in either a clockwise or a counterclockwise direction, but the direction of rotation must be the same for all odd hop numbered cells. Another method for assigning channels to an exemplary network may be to first select a channel assignment pattern from the channel assignments patterns shown in FIG. 92 through FIG. 97. The selected pattern may be assigned to the master cell. The pattern may then be rotated 60 degrees and the resulting channel pattern assigned to all one-hop cells. The pattern may then be rotated an additional 60 degrees and assigned to all two-hop cells, rotated an additional 60 degrees and assigned to all three-hop cells, and so forth. The rotation may be in either a clockwise or a counterclockwise direction, but the direction of rotation in the exemplary embodiment is the same for all rotations. An exemplary network formed using the first method, the channel assignment pattern of FIG. 92, and a clockwise rotation is shown in FIG. 99. The fourth network formation method may be used with wireless cells of different sizes. In an exemplary network, the wireless cell sizes differ by a factor of about one-half raised to an integer power. An exemplary network that includes wireless cells of different sizes, and channel assignment based on the first method, the channel assignment pattern of FIG. 92, and a clockwise rotation is shown in FIG. 100. Another method of assigning channels to a network formed using substantially triangular wireless cells may be to identify a hexagonal group of cells, assign a desired channel assignment pattern to the hexagonal group, and then propagate the core hexagonal channel assignment pattern throughout the network. Other methods of channel assignment may be used to provide, for example, exemplary network channel assignment where no opposing physical or virtual sectors may use the same or similar channels, networks where opposing physical or virtual sectors may use the same or similar channels, and other network embodiments with varying communication characteristics.

Now turning to exemplary methods for reducing interference between non-related wireless cells. Interference between wireless apparatus may reduce communication efficiency and/or throughput. In the case where a wireless cell desires to communicate with a client, interference with other wireless apparatus may, for example, reduce the data throughput, decrease the signal-to-noise ratio, increase retransmission requests, and increase the number of dropped or lost frames. Various methods may be used to reduce the impact of interference, for example, disabling physical or virtual sectors, altering channel assignment patterns, replacing conflicting wireless cells with wireless cells of smaller size, and decreasing the receive area of coverage of a wireless cell. Interference reduction methods may be used with wireless cells with a variety of characteristics such as, for example, wireless cells with non-overlapping physical sectors, wireless cells with overlapping physical sectors, and wireless cells whose shape of coverage may be (as described in two dimensions), for example, square, hexagonal, triangular, and circular. Interference reduction methods may be used with a variety of network formation methods and channel assignment patterns. For example, networks where adjacent and opposing physical and/or virtual sectors may use different, possibly minimally interfering, channels, networks where opposing physical and/or virtual sectors may use the same or similar channels, and networks where opposing physical and/or virtual sectors may have at least one channel that may be the same or similar and at least one channel that may be different, possibly minimally interfering.

Figure 101:
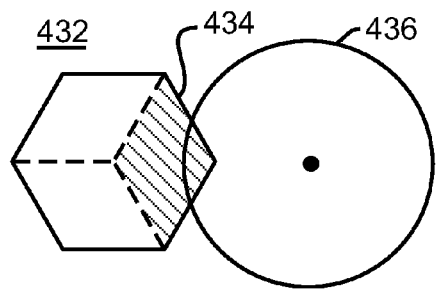
FIG. 101 is a diagram of an exemplary interference between a three-sector wireless cell and an omni-directional wireless cell.
Figure 102:
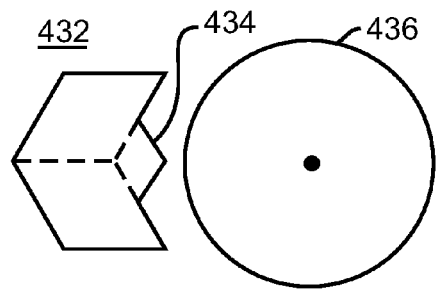
FIG. 102 is a diagram of an exemplary method for reducing interference by decreasing the receive size of the interfering physical sector.
Figure 103:
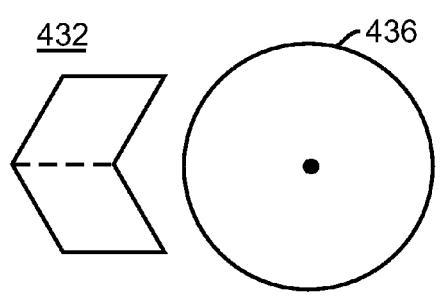
FIG. 103 is a diagram of an exemplary method for reducing interference by disabling the interfering physical sector.
Figure 104:
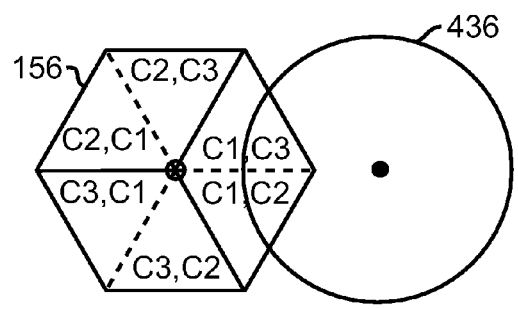
FIG. 104 is a diagram of an exemplary interference between a six physical sector, six virtual sector wireless cell and an omni-directional wireless cell.
Figure 105:
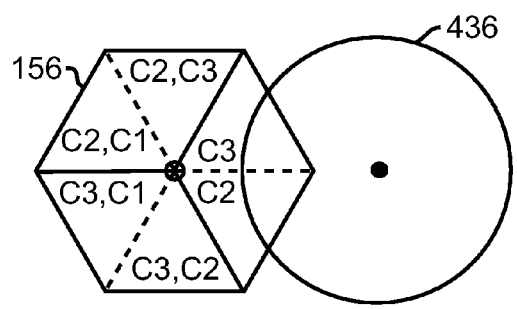
FIG. 105 is a diagram of an exemplary method for reducing wireless cell interference by disabling only the interfering physical sector.
Figure 106:
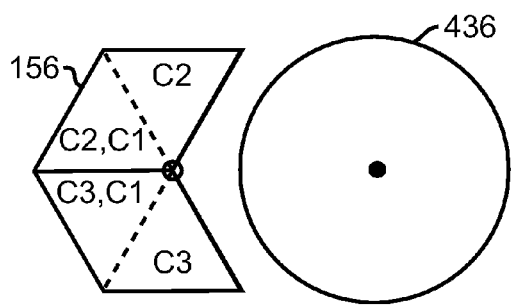
FIG. 106 is a diagram of an exemplary method for reducing wireless cell interference by disabling all overlapping physical sectors.

The method of reducing the receive area of coverage was discussed above. Attenuating the signals in the receive path may, for example, reduce the receive area of coverage and improve the signal-to-noise ratio. Referring to FIG. 101, interference may occur in a situation where the area of coverage of physical sector 434 of wireless cell 432 overlaps the area of coverage of omni-directional cell 436. Reducing the area of coverage of physical sector 434, as shown in FIG. 102, may reduce interference. Disabling physical sector 434, as shown in FIG. 103 may also reduce interference between wireless cell 432 and 436. In a situation where a conflict may occur with a physical sector of a wireless cell with overlapping coverage, disabling a physical sector may not mean that an area receives no coverage as in FIG. 103. For the purpose of describing one method of reducing interference with a wireless cell with overlapping sectors, referring to FIG. 104, assume that omni-directional wireless cell 436 interferes with channel C1 of physical sector 268 (refer to FIG. 37). Disabling physical sector 268 may reduce interference and may not leave a void in coverage. Referring to FIG. 105, physical sector 268 has been disabled, yet two virtual sectors using channel C3 and C2 still substantially cover the physical area of physical sector 268; therefore, even though physical sector 268 has been disabled, clients in the area may be serviced by other physical sectors. Another method that may reduce interference is to disable more than one of the physical sectors that may interfere with another wireless apparatus. Disabling all physical sectors of wireless cell 156 that may overlap omni-directional wireless cell 436 (i.e., physical sectors 268, 272, and 274) may result in the wireless cell coverage area and channel assignment pattern shown in FIG. 106. Wireless cell coverage areas do not necessary have to overlap to potentially interfere. Reducing the physical sector receive area or disabling a physical sector may also be used to reduce interference regardless of the proximity of the interfering device.

Figure 107:
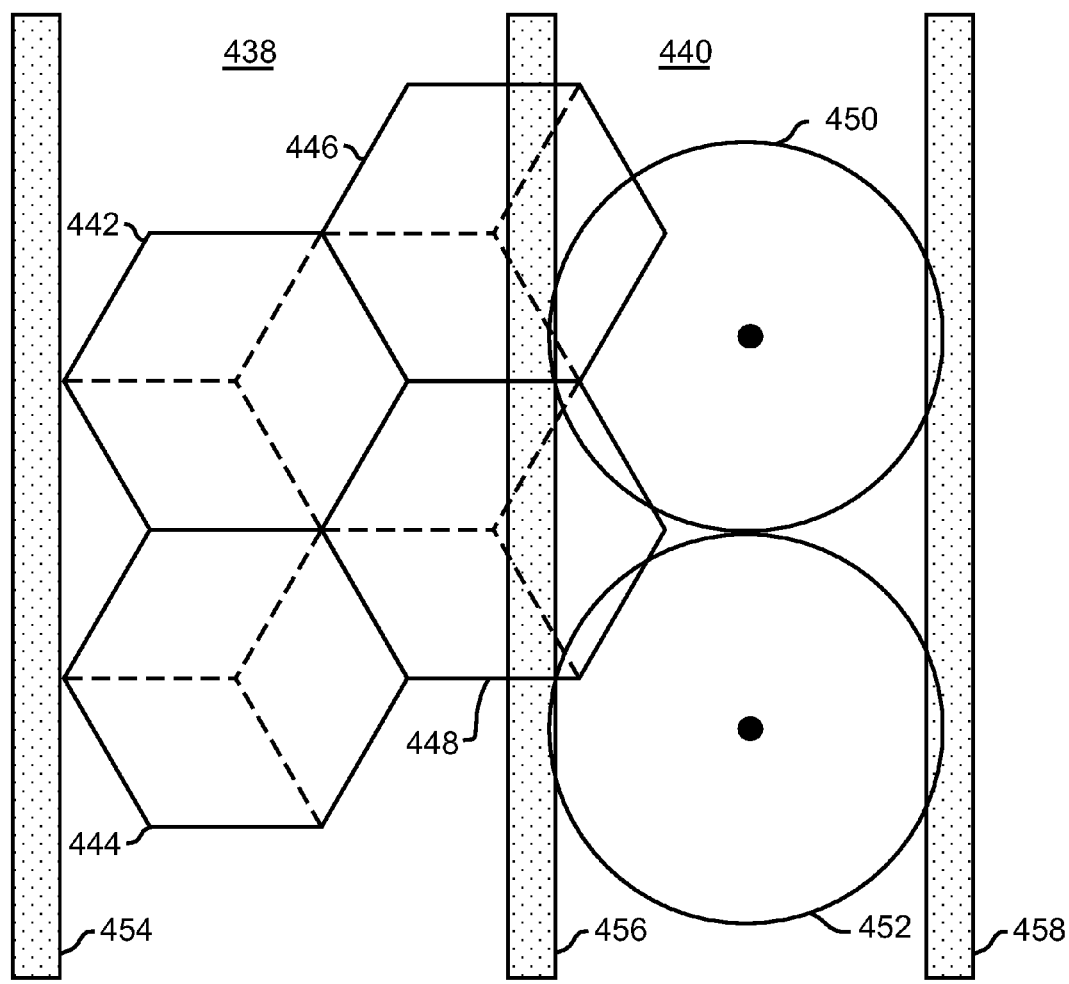
FIG. 107 is a diagram of an exemplary method for providing wireless cell network coverage that may interfere with nearby foreign wireless cells.
Figure 108:
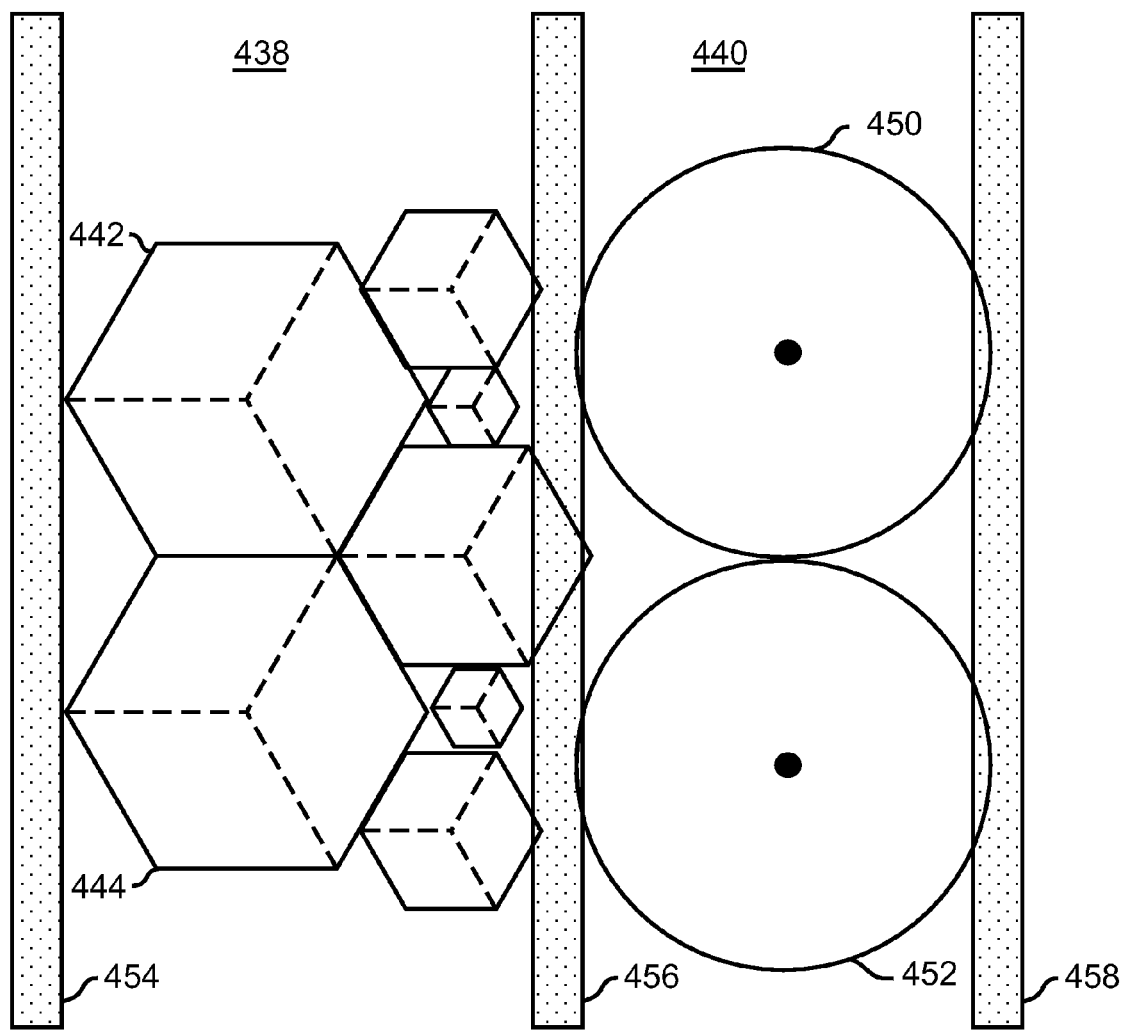
FIG. 108 is a diagram of an exemplary method for providing wireless cell network coverage that may not interfere with near-by foreign wireless cells.

Another method that may reduce interference between wireless cells may be to replace wireless cells that may conflict with other apparatus with smaller wireless cells that may not conflict. Independent wireless networks that may conflict with each other may service two areas, 438 and 440, depicted in FIG. 107 between three wide, vertical lines. Area 438, laying between boundaries 454 and 456, which may be for example, walls, partitions, and open space, uses wireless cells 446 and 448 to cover a portion of area 438. The areas of coverage of wireless cells 446 and 448 extend in to area 440 and may interfere with and/or be interfered with by omni-directional wireless cells 450 and/or 452. As described above, the physical sectors experiencing interference may be disabled; however, another method, referring to FIG. 108, may be to replace wireless cells 446 and 448 with smaller wireless cells that provide coverage between wireless cells 442 and 444 and boundary 456. The reduced coverage area of the smaller sized wireless cells may reduce interference.

Figure 109:
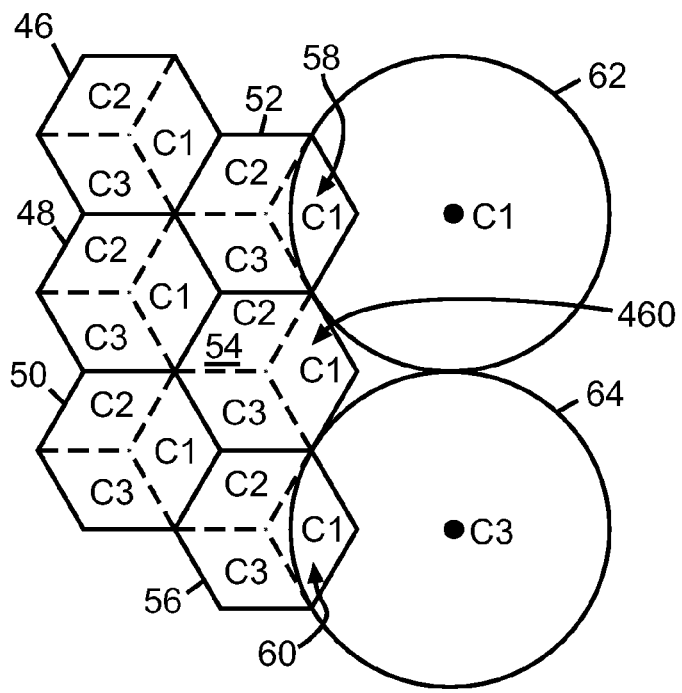
FIG. 109 is a diagram of an exemplary interference between some sectors of a wireless network and nearby foreign wireless cells.
Figure 110:
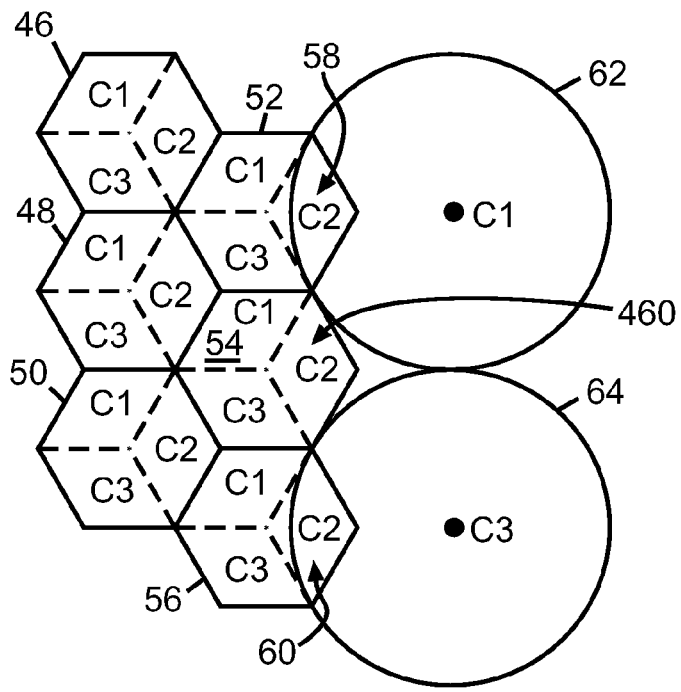
FIG. 110 is a diagram of an exemplary method for reducing interference between sectors of a wireless network and nearby foreign wireless cells by changing channel assignment pattern.

Another method that may reduce interference between wireless cells may be to modify channel assignment patterns. Various network formation methods, described above, may use channel assignment patterns where opposing sectors may use different, possibly minimally interfering, channels to potentially reduce interference between opposing sectors. Wireless cells 46 through 56 inclusive; of FIG. 109 form an exemplary network where opposing wireless cells may use different, possibly minimally interfering, channels. Omni-directional wireless cells 62 and 64 form a foreign wireless network. The physical sectors assigned the channel C1, 58, 60, and 460, in wireless cells 52, 54, and 56 may be positioned opposite omni-directional wireless cells 62 and 64 and may interfere with and/or be interfered with by omni-directional wireless cell 62 because it may also be assigned channel C1. Various steps may be taken to reduce interference, for example, physical sectors 58, 60, and 460 may be assigned a different, minimally interfering channel like, for example, channel C4. Another method may be to assign channel C2 to physical sectors 58, 60, and 460. Assigning channel C2 may introduce some interference with the physical sectors of wireless cells that may already be assigned channel C2; however, the overall interference may be less than leaving physical sectors 58, 60, and 460 assigned to channel C1. Altering the channel assignment pattern in all wireless cells, 46 through 56, may also reduce interference with foreign wireless cells 62 and 64. One method of alteration may be to assign a channel assignment pattern that uses channel C2 in physical sectors 58, 60, and 460, as shown in the exemplary channel assignment of FIG. 110. The exemplary channel assignment of FIG. 110 maintains different channels in opposing and adjacent physical sectors. Other channel assignment patterns may be possible. Wireless network embodiments composed of wireless cells that may use overlapping physical sectors and channel assignment patterns associated with overlapping physical sectors may also modify channel assignment patterns to cope with interference.

Channel assignment patterns are not limited to being static. Channel assignment patterns may be changed in response to, for example, changes in foreign network channels and changes in environmental conditions that may modify the effects of reflected or multi-path signals. One method for reducing the effects of interference may be to test various channel assignment patterns to determine which pattern may be least affected by interference. Another method for reducing interference may be to negotiate with a non-related, but nearby network for channel assignment patterns that may reduce interference for both networks. Another method may be to assign channels to physical sectors nearest to foreign wireless cells and/or networks that deliberately interfere with the foreign wireless cell or network in an attempt to get the foreign wireless cell or network to change to a different channel.

Now turning to exemplary network implementation methods. Implementing a network embodiment may be different from forming a network. Network formation methods, discussed above, dealt with issues such as, for example, channel pattern assignments, shape of wireless cells, area of coverage, wireless cell orientation, and position relative to other wireless cells. Some questions, important to implementing a network may remain unanswered by the network formation methods, such as, for example, how many cells may be needed to cover the desired physical space, what is the best cell orientation with respect to the physical space, what cell density may be required to met data throughput requirements, what barriers exist in the physical space, where may the wired network connections be best located, where in the physical space may wireless cells be placed so that cells are substantially adjacent, and how far do foreign networks penetrate into the physical space?

A first network implementation method may be a manual method where a first step may be to determine the characteristics of the physical space such as, for example, dimensions, location of electrical connections, location of wired network connection, signal strength of detectable foreign networks, data throughput estimates within the physical space, barriers that may prevent the placement of wireless cells, and physical objects that may interfere with or modify wireless cell radiation properties. A next step may be to record the physical information and other information discovered in the first step. An exemplary method would be to record the physical space information to scale and to note other information such as, for example, desired data throughput, foreign network channel assignments, and foreign network signal strengths, on the record of the physical space or in a separate, but accessible location. The next step may be to try various combinations of wireless cell networks until a solution that may be optimal is found. Trying various combinations may include using the network formation methods describe above. Combinations of network characteristics may be iterated until a combination may be found that meets a maximum number of desired network requirements. All techniques known to one skilled in the art of drafting, electrical planning, network planning, or other fields may be used in the implementation stage. Once the plan reaches a desired state of readiness, the deployment stage of physical placement and setup of the wireless cells may begin. Wireless cell characteristics, such as, for example, area of coverage, angle of coverage, shape of coverage, channel assignment patterns, and all other desired characteristics may be adjusted, according to plan, as the wireless cells are physically placed.

An exemplary second network implementation method may be similar to the first method network implementation method in that information about the physical space may be combined with desired network performance goals and environmental information; however, the second network implementation method may be different in that the physical, desired performance, and foreign network information may be entered into and manipulated by a computer that may use software adapted for network implementation. A first step of the second network implementation method may be similar to the first network implementation method in that, for example, information that pertains to the physical space may be collected. A next step may be to enter the physical space information into the computer. A next step may be to enter the desired network performance information into the computer. A next step may be for the computer to perform iterations in search of an optimal network formation. In another embodiment, the user may be allowed to perform some level of manual planning and placement of wireless cells with the computer performing other steps. In another embodiment, the computer uses network formation methods to automatically generate a network for the desired physical space. Automatic generation may be influenced by such factors as, for example, foreign wireless signal strength, desired throughput, cell density required to reach desired throughput, actual equipment available on the market, and cell sizes required to provide desired coverage. In another embodiment, the computer uses network formation methods to automatically generate a network, which may be manually modified by the user. The implementation software may offer the user implementation aids, for example, wireless cell templates, wireless cell templates of adjustable size, user or automatic adjustment of receive and transmit sizes, user required wireless cell characteristics, and the ability to freeze part of the plan or cell characteristics while iterating on other parts of the network. Once an optimal plan or several plans that may be nearly equivalent are found, the deployment phase may begin. Once the wireless cells are physically placed according to plan, the computer running the implementation program may interface with the wireless cells and may program each cell with the planned characteristics. The implementation program may also exercise the network and may test actual performance. Additional steps may include, for example, additional optimization cycles when actual, tested performance does not match planned performance.

A third network implementation method may start with the physical deployment step. Wireless cells may be placed where desirable or physically possible. A next step may be to program the wireless cell characteristics using, for example, manual techniques as described in the first network implementation method, a computer and computer program assistance, a combination of manual and computer assist, and fully automatically with cell-to-cell communication. Wireless cells equipped to cooperate during the programming process may perform fully automatic determination and programming of the characteristics of each wireless cell. In one fully automatic method, a wireless cell may be selected as the central wireless cell. The central wireless cell may coordinate and control the process wherein each wireless cell, for example, measures proximity to other wireless cells, detects foreign networks, and determines optimal size. Data collected by each wireless cell may be fed back to the selected central control wireless cell, which may perform calculation iterations to determine, for example, optimal characteristics for each wireless cell, channel assignment patterns, disabled physical sectors, and coverage area. An additional step may be feeding actual performance information back to the central wireless cell, which may determine new settings that may improve network performance.

What is claimed is:

1. A method for assigning channels to a plurality of wireless cells of a network, the method comprising:
   identifying a master wireless cell of a network having opposing physical sectors and a plurality of wireless cells, wherein each wireless cells has a shape of coverage similar to a triangle;
   assigning the master wireless cell a hop number of zero;
   setting a current hop number to zero;
   setting a next hop number to one;
   identifying a wireless cells physically closest to each of the current hop number cells;
   assigning an identified cell the next hop number;
   incrementing the current hop number and the next hop number by one;
   repeating the identifying step, the assigning step, and the incrementing step until all wireless cells of the network are assigned a hop number;
   selecting a channel assignment pattern;
   assigning the channel assignment pattern to the master wireless cell and to all wireless cells having an even hop number;
   rotating the channel assignment pattern about 60-degrees in a direction selected from the group of clockwise and counter-clockwise;
   assigning the rotated channel assignment pattern to all wireless cells having an odd hop number.

2. The method of claim 1 wherein at least two of the opposing physical sectors are assigned the same channel.

3. The method of claim 1 wherein none of the opposing physical sectors are assigned the same channel.

4. A method for facilitating the assignment of channels to network, the method comprising:
   identifying a master wireless cell of a network having opposing physical sectors and a plurality of wireless cells, wherein each wireless cells has a shape of coverage similar to a square;
   assigning the master wireless cell a hop number of zero;
   setting a current hop number to zero;
   setting a next hop number to one;
   identifying a wireless cells physically closest to each of the current hop number cells;
   assigning an identified cell the next hop number;
   incrementing the current hop number and the next hop number by one;
   repeating the identifying step, the assigning step, and the incrementing step until all wireless cells of the network are assigned a hop number;
   forming a nine-cell channel pattern by assigning a channel assignment pattern to the master wireless cell, to each of the wireless cells assigned a hop number of one, and to each of the wireless cells that are substantially adjacent to two wireless cells assigned a hop number of one;
   assigning the nine-cell channel pattern to the plurality of wireless cells such that the center cell of the nine-cell channel assignment pattern falls only on wireless cells assigned an even hop number.

5. The method of claim 4 wherein at least two of the opposing physical sectors are assigned the same channel.

6. The method of claim 4 wherein none of the opposing physical sectors are assigned the same channel.

* * * * *